United States Patent
Tausch et al.

(10) Patent No.: US 12,455,007 B2
(45) Date of Patent: Oct. 28, 2025

(54) METHOD FOR CONTROLLING A POWERTRAIN OF A VEHICLE HAVING A DUAL-CLUTCH TRANSMISSION

(71) Applicant: BRP-ROTAX GMBH & CO. KG, Gunskirchen (AT)

(72) Inventors: Alexander Tausch, Innerschwand (AT); Robert Ebner, Edt bei Lambach (AT); Verena Wolfsegger, Roitham am Traunfall (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 19/045,938

(22) Filed: Feb. 5, 2025

(65) Prior Publication Data
US 2025/0180114 A1 Jun. 5, 2025

Related U.S. Application Data

(63) Continuation of application No. 18/506,224, filed on Nov. 10, 2023, now Pat. No. 12,253,165, which is a
(Continued)

(51) Int. Cl.
| | | |
|---|---|---|
| *F16H 61/688* | (2006.01) | |
| *F16H 3/00* | (2006.01) | |
| *F16H 61/04* | (2006.01) | |

(52) U.S. Cl.
CPC .......... *F16H 61/688* (2013.01); *F16H 3/006* (2013.01); *F16H 61/0403* (2013.01); *F16H 2306/24* (2013.01); *F16H 2306/48* (2013.01)

(58) Field of Classification Search
CPC .......... F16H 2061/0065; F16H 61/688; F16H 61/0403; F16H 3/006; F16H 2306/24;
(Continued)

(56) References Cited

U.S. PATENT DOCUMENTS

| | | |
|---|---|---|
| 6,881,171 B2 | 4/2005 | Kuhstrebe et al. |
| 8,612,104 B2 | 12/2013 | Kojima et al. |
| | (Continued) | |

FOREIGN PATENT DOCUMENTS

JP 2015137593 A * 7/2015

OTHER PUBLICATIONS

MotorTrend, 2021 Tesla Model S Plaid: How to Use Launch Control to Eclipse Ludricous Speed, retrieved form https://www.motortrend.com/reviews/2022-tesla-model-s-plaid-launch-control-how-to-use-test/ on Dec. 21, 2021.

*Primary Examiner* — Timothy Hannon
(74) *Attorney, Agent, or Firm* — BCF LLP

(57) ABSTRACT

A method for controlling a powertrain of a vehicle, the powertrain a dual-clutch transmission including a first clutch and a second clutch selectively actuated to transmit motion from the engine to a first shaft and a second shaft respectively. The method includes producing a first shift request for shifting from an initial gear to a different gear; in response to the first shift request, executing a first shift sequence to shift from the initial gear to the different gear; during execution of the first shift sequence, producing a second shift request for shifting from the different gear to the initial gear; in response to the second shift request: interrupting the first shift sequence prior to the first shift sequence having finished; and executing a second shift sequence to reverse the first shift sequence such that the transmission engages the initial gear for driving on the first shaft.

12 Claims, 24 Drawing Sheets

Related U.S. Application Data continuation of application No. 18/162,087, filed on Jan. 31, 2023, now Pat. No. 11,873,895.

(60) Provisional application No. 63/304,909, filed on Jan. 31, 2022.

(58) Field of Classification Search
CPC ........ F16H 2306/48; B60W 30/18027; B60W 10/02; B60W 10/06
See application file for complete search history.

(56) References Cited

U.S. PATENT DOCUMENTS

| | | |
|---|---|---|
| 9,212,737 B2 | 12/2015 | Nakamura et al. |
| 9,546,721 B2 | 1/2017 | Mittelberger et al. |
| 9,981,519 B2 | 5/2018 | Despres-Nadeau et al. |
| 10,753,460 B2 | 8/2020 | McGuire et al. |
| 10,882,524 B2* | 1/2021 | Cunningham .. B60W 30/18027 |
| 11,472,410 B2* | 10/2022 | Pettersson ............. B60W 10/02 |
| 2003/0178278 A1 | 9/2003 | Shigyo |
| 2004/0166990 A1 | 8/2004 | Buchanan et al. |
| 2006/0037422 A1 | 2/2006 | Kuhstrebe et al. |
| 2008/0006029 A1 | 1/2008 | Kitou et al. |
| 2015/0167755 A1 | 6/2015 | Yoon |
| 2015/0266479 A1* | 9/2015 | Blakeway ....... B60W 30/18027 477/92 |
| 2016/0069453 A1 | 3/2016 | Atmaram et al. |
| 2016/0194005 A1 | 7/2016 | Goeppert et al. |
| 2017/0037957 A1 | 2/2017 | Monajemi et al. |
| 2018/0112770 A1 | 4/2018 | Hansson et al. |
| 2019/0249728 A1* | 8/2019 | Grosser ............... B60W 30/186 |
| 2019/0389478 A1 | 12/2019 | Norstad |
| 2024/0262359 A1* | 8/2024 | Corallo ................. B60W 10/02 |

\* cited by examiner

METHOD FOR CONTROLLING A POWERTRAIN OF A VEHICLE HAVING A DUAL-CLUTCH TRANSMISSION

CROSS-REFERENCE

The present application is a continuation of U.S. patent application Ser. No. 18/506,224, filed Nov. 10, 2023, entitled "Method for Controlling a Powertrain of a Vehicle Having a Dual-Clutch Transmission," which is a continuation of U.S. patent application Ser. No. 18/162,087, filed Jan. 31, 2023, now patented as U.S. Pat. No. 11,873,895, which claims priority to U.S. Provisional Patent Application No. 63/304,909, entitled "Method for Controlling a Powertrain of a Vehicle Having a Dual-Clutch Transmission," filed on Jan. 31, 2022, the entirety of each of which is incorporated by reference herein.

TECHNICAL FIELD

The present technology relates to methods for controlling a powertrain of a vehicle having a dual-clutch transmission.

BACKGROUND

Off-road vehicles have powertrains that can incorporate different types of transmission, such as a continuously variable transmission (CVT) or a manually operated transmission. However, other types of transmissions could be used in off-road vehicles and offer different performance in certain conditions than the aforementioned CVT and manually operated transmission.

A dual-clutch transmission (DCT) is a type of transmission that includes first and second clutches. The first clutch drives the odd-numbered transmission gears via a first shaft, and the second clutch drives the even-numbered transmission gears via a second shaft. In a DCT, gear changes can be accomplished without interrupting torque distribution to the driven wheels. The torque of the engine is applied to one clutch at the same time as it is being disconnected from the other clutch. Since alternate gear ratios can preselect an odd transmission gear on one shaft while the vehicle is being driven in an even transmission gear (and vice versa), DCTs offer good shifting performance and efficiency in certain conditions. However, dual-clutch transmissions have not been made widely available in off-road vehicles yet. Reasons causing the delay of their widespread adoption in off-road vehicles include relatively high manufacturing costs and packaging issues due to the limited space in the engine compartment.

Therefore, there is a desire for dual-clutch transmissions that can be efficiently packaged in an off-road vehicle, while having reduced manufacturing costs.

SUMMARY

It is an object of the present to ameliorate at least some of the inconveniences present in the prior art.

According to an aspect of the present technology, there is provided a method for controlling a powertrain of a vehicle, the powertrain comprising: an internal combustion engine; and a dual-clutch transmission operatively connected to the engine, the dual-clutch transmission comprising: a first clutch and a second clutch selectively actuated to transmit motion from the engine to a first shaft and a second shaft respectively; at least one first gear mounted to the first shaft; at least one second gear mounted to the second shaft, the at least one first gear and the at least one second gear defining in part a main transmission of the dual-clutch transmission; and a subtransmission operatively connected to the main transmission, the subtransmission comprising: an input shaft; a high transmission gear and a low transmission gear mounted to the input shaft, the high transmission gear and the low transmission being selectively engageable to place the subtransmission in a high transmission setting and a low transmission setting respectively; and an output shaft operatively connected to the input shaft by a selected one of the high transmission gear and the low transmission gear, the method comprising: operating the dual-clutch transmission while the vehicle is in motion with one of the high transmission gear and the low transmission gear drivingly engaged to the input shaft; during said operating, receiving a shift request to engage an other one of the high transmission gear and the low transmission gear to the input shaft in order to drive the output shaft with the other one of the high transmission gear and the low transmission gear; in response to the shift request: reducing a torque output of the engine and a torque of each of the first and second clutches; shifting the subtransmission to a neutral gear setting whereby the output shaft is drivingly disconnected from the input shaft; after shifting the subtransmission to the neutral gear setting, selecting one of the at least one first gear and the at least one second gear to drive the subtransmission in order for the input shaft to turn, relative to the output shaft, at an input shaft speed according to a gear ratio that would be implemented between the input and output shafts by the other one of the high transmission gear and the low transmission gear; shifting the main transmission to engage the selected one of the at least one first gear and the at least one second gear to drive the subtransmission; after shifting the main transmission, shifting the subtransmission to the other one of the high transmission gear and the low transmission gear; and after shifting the subtransmission to the other one of the high transmission gear and the low transmission gear, controlling the torque output of the engine and the torque of the first and second clutches according to a driver request at an accelerator of the vehicle.

In some embodiments, the method further includes determining a target engine speed required to maintain a speed of the vehicle when the selected one of the at least one first and the at least one second gear is drivingly engaged; and controlling the engine to change a current engine speed to the target engine speed.

In some embodiments, the method further includes, after shifting the subtransmission to the other one of the high transmission gear and the low transmission gear but prior to controlling the torque output of the engine and the torque of the first and second clutches according to the driver request: controlling the engine to change a current engine speed to approximately match a speed of the selected one of the at least one first gear and the at least one second gear.

In some embodiments, in response to the shift request being for engaging the low transmission gear to the input shaft, the method further includes comparing an operating speed associated with the vehicle to a predetermined speed; and denying the shift request in response to the operating speed associated with the vehicle being greater than the predetermined speed.

In some embodiments, in response to the shift request being for engaging the high transmission gear to the input shaft, the method further comprises: comparing an operating speed associated with the vehicle to a predetermined speed; comparing the torque output of the engine to a predetermined engine torque; denying the shift request in response to: the operating speed associated with the vehicle being less than or equal to the predetermined speed; and the torque output of the engine being greater than the predetermined engine torque.

In some embodiments, the method further comprises, after denying the shift request, displaying an indication to a driver of the vehicle indicative of a denial of the shift request.

In some embodiments, a vehicle comprises: a frame; a driver seat connected to the frame; a plurality of ground-engaging wheels operatively connected to the frame; a powertrain comprising: an internal combustion engine supported by the frame; and a dual-clutch transmission operatively connected to the engine, the dual-clutch transmission comprising: a first clutch and a second clutch selectively actuated to transmit motion from the engine to a first shaft and a second shaft respectively; at least one first gear mounted to the first shaft; at least one second gear mounted to the second shaft, the at least one first gear and the at least one second gear defining in part a main transmission of the dual-clutch transmission; and a subtransmission operatively connected to the main transmission, the subtransmission comprising: an input shaft; a high transmission gear and a low transmission gear mounted to the input shaft, the high transmission gear and the low transmission being selectively engageable to place the subtransmission in a high transmission setting and a low transmission setting respectively; and an output shaft operatively connected to the input shaft by a selected one of the high transmission gear and the low transmission gear, the output shaft being operatively connected to at least one of the plurality of ground-engaging wheels; and a controller in communication with the engine and the dual-clutch transmission, the controller being configured to perform the method.

In some embodiments, the vehicle is an off-road vehicle.

According to another aspect of the present technology, there is provided a method for controlling a powertrain of a vehicle, the powertrain comprising: an internal combustion engine; and a dual-clutch transmission operatively connected to the engine, the dual-clutch transmission comprising: a first clutch and a second clutch selectively actuated to transmit motion from the engine to a first shaft and a second shaft respectively; at least one first gear mounted to the first shaft; and at least one second gear mounted to the second shaft, the method comprising: producing a first shift request for shifting the dual-clutch transmission from an initial gear to a different gear, the initial gear being engaged on the first shaft, the initial gear being one of the at least one first gear, the different gear being one of the at least one second gear; in response to the first shift request, executing a first shift sequence to shift the dual-clutch transmission from the initial gear to the different gear; during execution of the first shift sequence, producing a second shift request for shifting the dual-clutch transmission from the different gear to the initial gear; in response to the second shift request: interrupting the first shift sequence prior to the first shift sequence having finished; and executing a second shift sequence to reverse the first shift sequence such that the dual-clutch transmission engages the initial gear for driving on the first shaft.

In some embodiments, the method further comprises, during execution of the first shift sequence: detecting an operational change related to operation of the vehicle; and determining that that the operational change requires engagement of the initial gear; the second shift request is executed in response to said determining.

In some embodiments, the first shift sequence comprises: engaging the different gear on the second shaft; and after engaging the different gear: decreasing a torque of the first clutch to disengage the first clutch from the engine; and increasing a torque of the second clutch to engage the second clutch with the engine; and adjusting a speed of the engine.

In some embodiments, the first shift sequence further comprises: after adjusting the speed of the engine and after disengaging the first clutch from the engine and engaging the second clutch with the engine, disengaging the initial gear on the first shaft.

In some embodiments, decreasing the torque of the first clutch to disengage the first clutch from the engine comprises decreasing the torque of the first clutch to a kisspoint torque value of the first clutch or lower; and increasing the torque of the second clutch to engage the second clutch with the engine comprises increasing the torque of the second clutch to a microslip torque value of the second clutch or higher.

In some embodiments, adjusting the speed of the engine comprises: if the different gear is a higher gear than the initial gear, decreasing the speed of the engine after the second clutch is engaged with the engine; and if the different gear is a lower gear than the initial gear, increasing the speed of the engine prior to the second clutch being engaged with the engine.

In some embodiments, in response to the first shift sequence being interrupted before adjusting the speed of the engine, interrupting the first shift sequence comprises: stopping the decreasing of the torque of the first clutch before the torque of the first clutch reaches a kisspoint torque value of the first clutch; and stopping the increasing of the torque of the second clutch before the torque of the second clutch reaches a microslip torque value of the second clutch.

In some embodiments, the second shift sequence comprises: lowering the torque of the second clutch to at least a kisspoint torque value of the second clutch; increasing the torque of the first clutch to at least a microslip torque value of the first clutch; and maintaining the initial gear engaged on the first shaft.

In some embodiments, the second shift sequence further comprises disengaging the different gear on the second shaft.

In some embodiments, in response to the first shift sequence being interrupted during or after the adjusting of the speed of the engine, interrupting the first shift sequence comprises stopping the adjusting of the speed of the engine.

In some embodiments, adjusting the speed of the engine comprises: if the different gear is a higher gear than the initial gear, decreasing the speed of the engine after the second clutch is engaged with the engine; and if the different gear is a lower gear than the initial gear, increasing the speed of the engine prior to the second clutch being engaged with the engine.

In some embodiments, the second shift sequence comprises: if the different gear is a higher gear than the initial gear: increasing the speed of the engine to a speed that is appropriate for driving the initial gear; after increasing the speed of the engine: lowering the torque of the second clutch to at least a kisspoint torque value of the second clutch; and increasing the torque of the first clutch to at least a microslip torque value of the first clutch; and if the different gear is a lower gear than the initial gear, decreasing the speed of the engine to a speed that is appropriate for driving the initial gear.

According to another aspect of the present technology, there is provided a method for accelerating a vehicle from rest, the vehicle having a powertrain including an internal combustion engine; and an automatic transmission operatively connected to the engine, the automatic transmission including a clutch selectively actuated to transmit motion from the engine to a shaft; at least one gear mounted to the shaft. The method includes controlling the powertrain according to a first control strategy; while the vehicle is at rest, receiving a mode indication indicating that a driver of the vehicle has selected a launch control mode for accelerating the vehicle from rest; receiving a brake-on indication indicating that a braking system of the vehicle has been activated; determining that an accelerator of the vehicle is in a launch control acceleration position; in response to receiving at least the mode indication and the brake-on indication and determining that the acceleration is in the launch control acceleration position, controlling the powertrain according to a second control strategy to limit the speed of the engine to an increased idle speed; increase a torque of the clutch to a predetermined torque value higher than the kisspoint torque value; while controlling the powertrain according to the second control strategy receiving a brake-off indication indicating that the braking system has been released; in response to receiving the brake-off indication, increasing the torque of the clutch according to a predefined first ramp to drive a lowest gear of the at least one gear engaged to the shaft; determining that an amount of clutch slip is below a predetermined first threshold; in response to the amount of clutch slip being below the predetermined first threshold, stopping limiting the speed of the engine; and further increasing the torque of the clutch according to a predefined second ramp until the clutch slip is below a second threshold.

In some embodiments, the second threshold is below the first threshold.

In some embodiments, the method further includes, in response to stopping limiting the speed of the engine, increasing engine speed according to a position of the accelerator.

In some embodiments, the vehicle further includes a turbocharger operatively connected to the engine; and the increase of the speed of the engine to the increased idle speed causes the turbocharger to provide additional boost pressure to the engine.

In some embodiments, the method further includes prior to receiving the mode indication, determining that each of a plurality of initial mode conditions have been met; and in response to the plurality of initial mode conditions being met, enabling a mode input, the mode indication being transmitted to the controller from the mode input upon selection of the launch mode by the operator via the mode input.

In some embodiments, the method further comprises, while controlling the engine according to the second control strategy: determining that at least one deactivation condition has been met; and in response to the at least one deactivation condition being met, returning to a standard operation mode whereby the powertrain is operated according to the first control strategy.

In some embodiments, determining that the at least one deactivation condition has been met includes determining that a time limit of controlling the powertrain according to the second control strategy has been reached.

In some embodiments, determining that the at least one deactivation condition has been met includes determining that the accelerator position has decreased from the launch control acceleration position.

In some embodiments, determining that the at least one deactivation condition has been met includes determining that the automatic transmission has been shifted from the lowest gear of the at least one first gear to the lowest gear of the at least one second gear.

In some embodiments, the method further comprises, subsequent to receiving the mode indication and prior to receiving the brake-off indication: determining that at least one pre-launch deactivation condition has been met; and in response to the at least one pre-launch deactivation condition being met, returning to a standard operation mode whereby the vehicle is operated according to the first control strategy.

In some embodiments, wherein determining that the at least one pre-launch deactivation condition has been met includes determining that a time limit for receiving the brake-on indication has been reached.

In some embodiments, determining that the at least one deactivation condition has been met includes determining that a temperature of transmission fluid of the automatic transmission is equal to or greater than a predetermined temperature threshold.

In some embodiments, the predefined ramp according to which the torque of the clutch is increased in the second control strategy is greater than a standard ramp according to which the torque of the clutch is increase in the first control strategy.

In some embodiments, a vehicle comprises: a frame; a driver seat connected to the frame; a plurality of ground-engaging wheels operatively connected to the frame; a powertrain comprising: an internal combustion engine supported by the frame; a turbocharger operatively connected to the engine; and a dual-clutch transmission operatively connected to the engine, the dual-clutch transmission comprising: a first clutch and a second clutch selectively actuated to transmit motion from the engine to a first shaft and a second shaft respectively; at least one first gear mounted to the first shaft; and at least one second gear mounted to the second shaft, a controller in communication with the engine and the dual-clutch transmission; and an accelerator in communication with the controller, the controller being configured to perform the method.

In some embodiments, the vehicle is an off-road vehicle; and the accelerator is an accelerator pedal.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
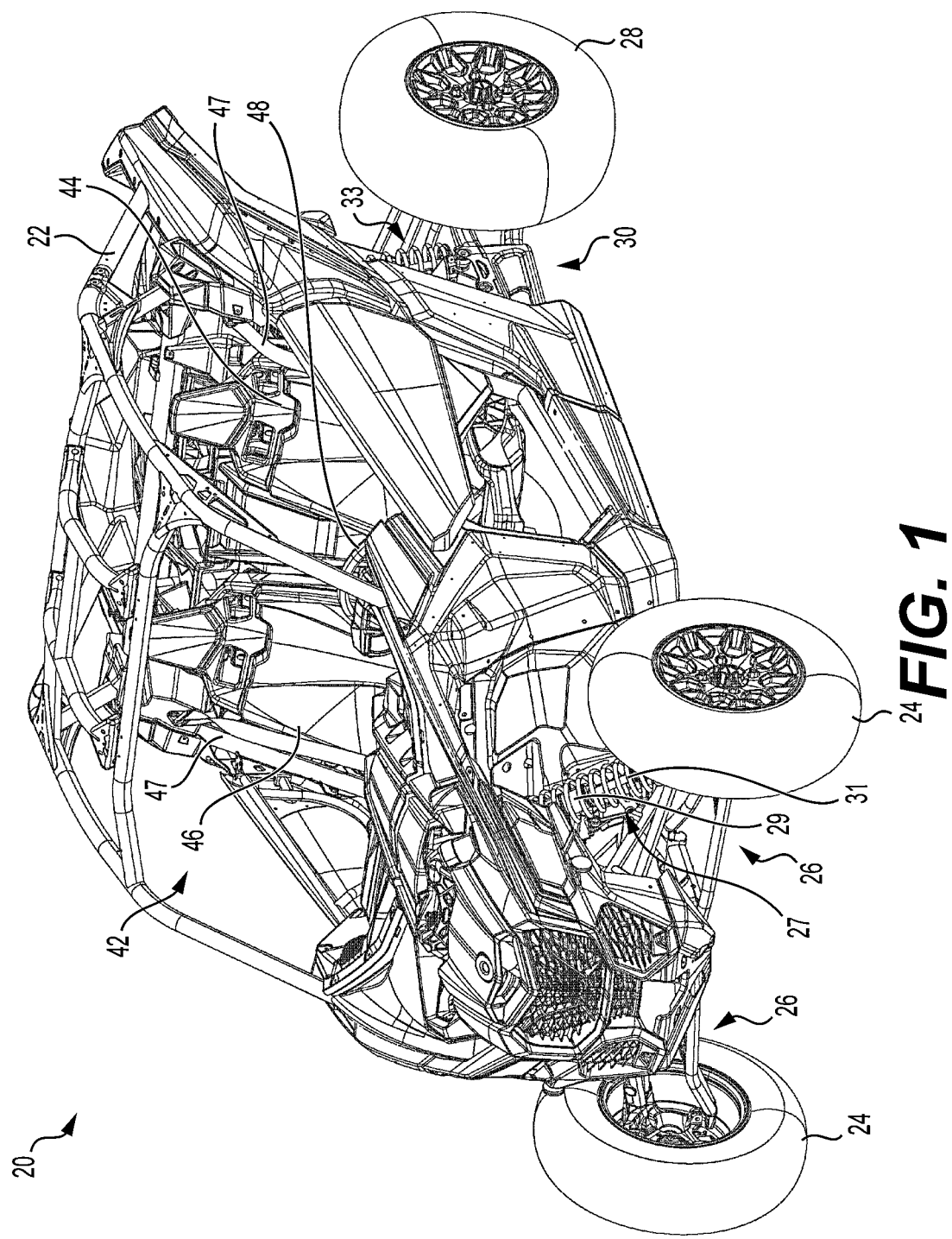
FIG. 1 is a perspective view taken from a top, front, left side of an off-road vehicle.

A dual-clutch transmission (DCT) 100 will be described herein with respect to a four-wheel side-by-side off-road vehicle 20, but it is contemplated that the DCT 100 could be used in other types of vehicles such as, but not limited to, off-road vehicles having more or less than four wheels and/or more or less than two seats. The general features of the off-road vehicle 20 will be described with respect to FIGS. 1 and 2.

The vehicle 20 has a frame 22, two front wheels 24 connected to a front of the frame 22 by front suspension assemblies 26 and two rear wheels 28 connected to the frame 22 by rear suspension assemblies 30 such as those described in U.S. Pat. No. 9,981,519 B2, dated May 29, 2018. Each front suspension assembly 26 has a front shock absorber assembly 27 including a shock absorber 29 and a spring 31. Each rear suspension assembly 30 has a rear shock absorber assembly 33 including a shock absorber 35 and a spring 37. Ground engaging members other than wheels 24, 28 are contemplated for the vehicle 20, such as tracks or skis. In addition, although four ground engaging members are illustrated in the Figures, the vehicle 20 could include more or less than four ground engaging members. Furthermore, different combinations of ground engaging members, such as tracks used in combination with skis, are contemplated.

The frame 22 defines a central cockpit area 42 inside which are disposed a driver seat 44 and a passenger seat 46. In the present implementation, the driver seat 44 is disposed on the left side of the vehicle 20 and the passenger seat 46 is disposed on the right side of the vehicle 20. However, it is contemplated that the driver seat 44 could be disposed on the right side of the vehicle 20 and that the passenger seat 46 could be disposed on the left side of the vehicle 20. As can be seen in FIG. 1, the vehicle 20 further has a seat belt 47 for each one of the seats 44, 46. A steering wheel 48 is disposed in front of the driver seat 44. The steering wheel 48 is used to turn the front wheels 24 to steer the vehicle 20. Various displays and gauges 50 are disposed in front of the steering wheel 48 to provide information to the driver regarding the operating conditions of the vehicle 20. Examples of displays and gauges 50 include, but are not limited to, a speedometer, a tachometer, a fuel gauge, a transmission position display, and an oil temperature gauge.

Figure 2:
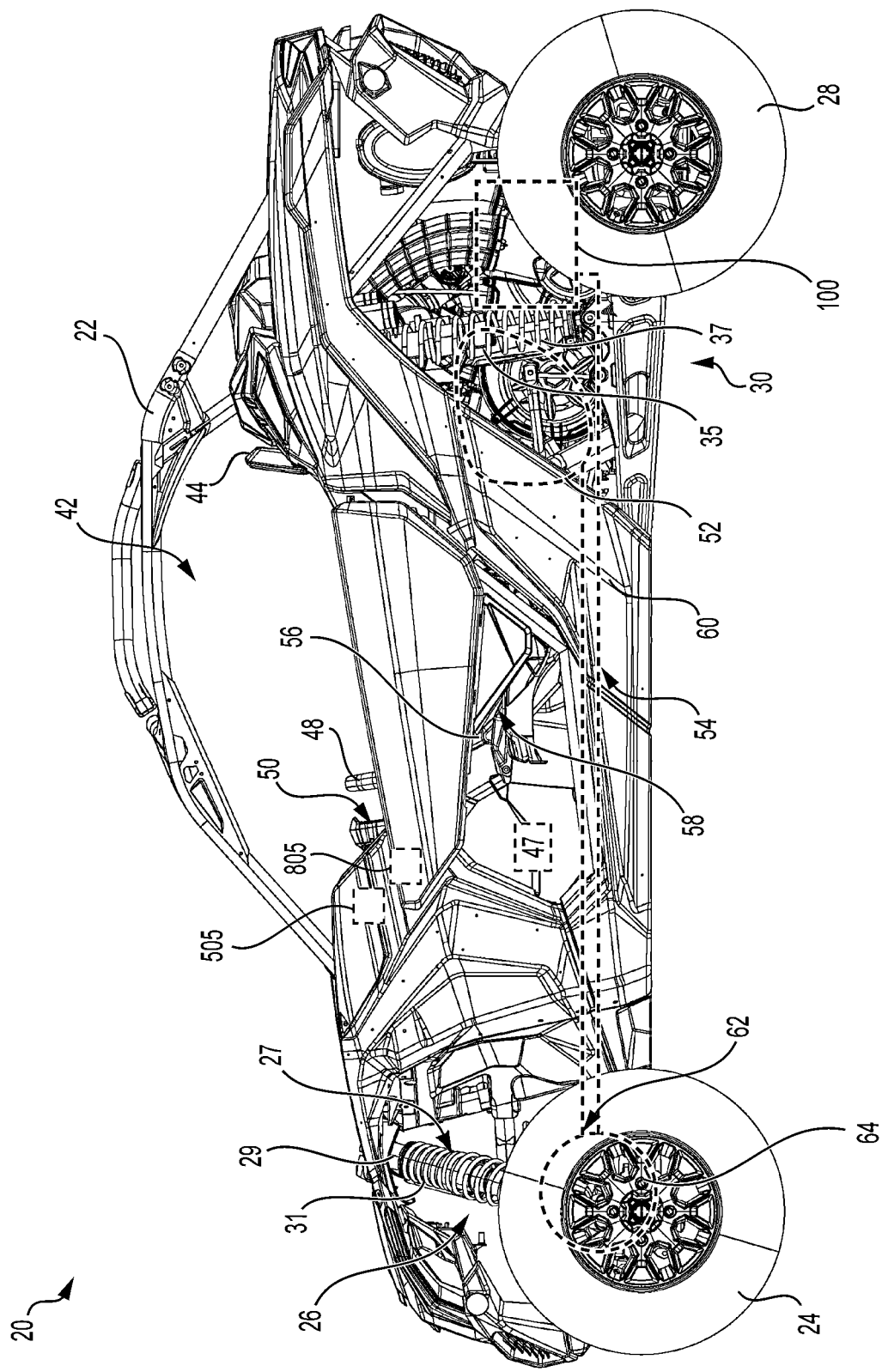
FIG. 2 is a left side elevation view of the off-road vehicle of FIG. 1.
Figure 3:
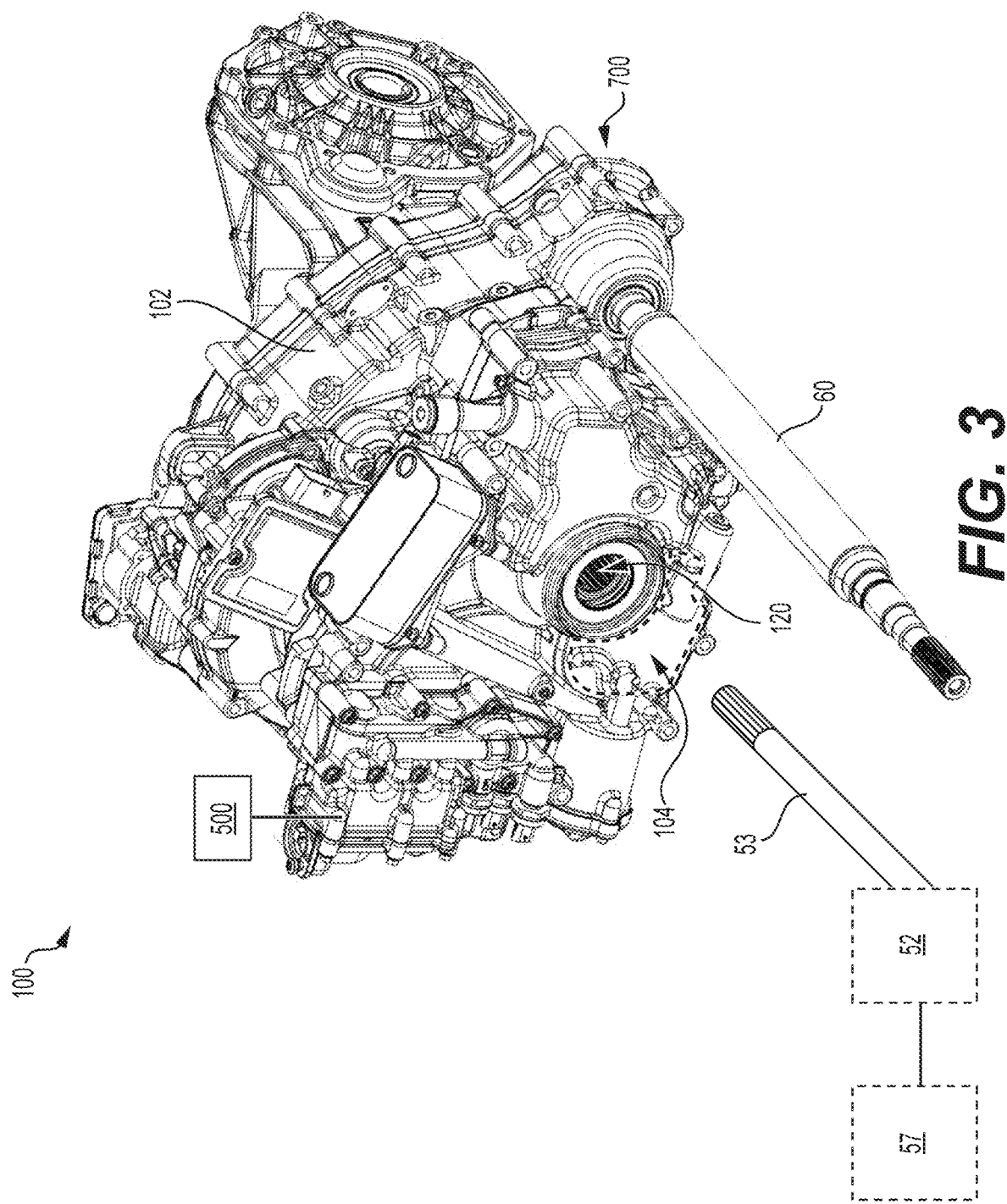
FIG. 3 is a perspective view taken from a top, front, left side of a dual-clutch transmission and front propeller shaft of the vehicle of FIG. 1.

Referring to FIG. 2, a powertrain of the vehicle 20 includes an internal combustion engine 52 (schematically shown in FIGS. 2 and 3) connected to the frame 22 in a rear portion of the vehicle 20. The engine 52 has a crankshaft 53 (schematically shown in FIG. 3) that is connected to the DCT 100 disposed behind the engine 52 (both schematically shown in FIG. 2). The vehicle 20 has an accelerator 45 (FIG. 2) in the central cockpit area 42 for use by the driver to control a position of a throttle valve (not shown) that regulates air intake into the engine 52, thereby controlling acceleration of the vehicle 20. In this embodiment, the accelerator 45 is an accelerator pedal for control with the driver's foot. It is contemplated that the accelerator 45 could be any other suitable type of accelerator in other embodiments (e.g., a lever at a handlebar). In this embodiment, as illustrated schematically in FIG. 3, the vehicle 10 has a turbocharger 57 operatively connected to the engine 52. The turbocharger 57 is driven by rotation of the crankshaft 53 to provide boost pressure to the engine 52 thereby increasing a power output of the engine 52. The DCT 100 includes a subtransmission 700 (FIGS. 4, 5 and 14) operatively connected to a driveline 54 (schematically shown in FIG. 2) of the vehicle 20 for operatively connecting the front and rear wheels 24, 28 to the engine 52 in order to propel the vehicle 20. A gear shifter 56 (FIG. 2) located between the seats 44, 46 operates the DCT 100 and the subtransmission 700 of the vehicle 20, and enables the driver to select one of a plurality of gear configurations for operation of the vehicle 20 (e.g., high or low gear settings, and a parking setting). It is contemplated that paddle shifters (not shown) could be mounted to the steering wheel 48 for enabling the driver to select a gear for operation of the vehicle 20. In the illustrated implementation of the vehicle 20, the gear configurations made available by the DCT 100 include a reverse gear, and forward first, second, third, fourth, fifth, sixth and seventh gear. The gear configurations made available by the subtransmission 700 include park, neutral, high forward gears, and low forward gears. Thus, the DCT 100 and the subtransmission 700 enable fourteen different forward-going gear configurations and two different reverse gear configurations. It is contemplated that the sequence and/or number of gear configurations could be different than as shown herein in other implementations.

A driving mode selector button 58 (FIG. 2) also enables the driver to select 2×4 or 4×4 operation of the vehicle 20. More particularly, the driveline 54 includes a front propeller shaft 60 which extends horizontally to the left of the engine 52 towards a front differential assembly 62 (schematically shown in FIG. 2). The front differential assembly 62 is operatively connected to the front wheels 24 via front wheel axle assemblies (not shown). The front differential assembly 62 includes an electronic selector 64 (also schematically shown in FIG. 2) operatively connected to the driving mode selector button 58. The electronic selector 64 allows to selectively connect the front propeller shaft 60 to the front wheel axle assemblies to enable 4×4 driving mode of the vehicle 20, or to selectively disconnect the front propeller shaft 60 from the front wheel axle assemblies to enable 2×4 driving mode of the vehicle 20 (i.e. with only the rear wheels 28 propelling the vehicle 20).

The vehicle 20 further includes other components such as brakes, a radiator, headlights, and the like. As it is believed that these components would be readily recognized by one of ordinary skill in the art, further explanation and description of these components will not be provided herein.

Turning now to FIGS. 3 to 14, the DCT 100 will be described in more detail. The DCT 100 includes a housing 102 that is separate from the internal combustion engine 52. The housing 102 is flanged to a rear face of the internal combustion engine 52. In addition, the housing 102 has a dedicated hydraulic and lubrication oil circuit, separated from that of the engine 52. A transmission fluid pump 104 (schematically shown in FIG. 3) is received inside the housing 102. The transmission fluid pump 104 is adapted to selectively pump transmission fluid, such as oil-based fluids. Again, in the present implementation, the transmission fluid pump 104 is separated from any other pump(s) the engine 52 may have.

Figure 4:
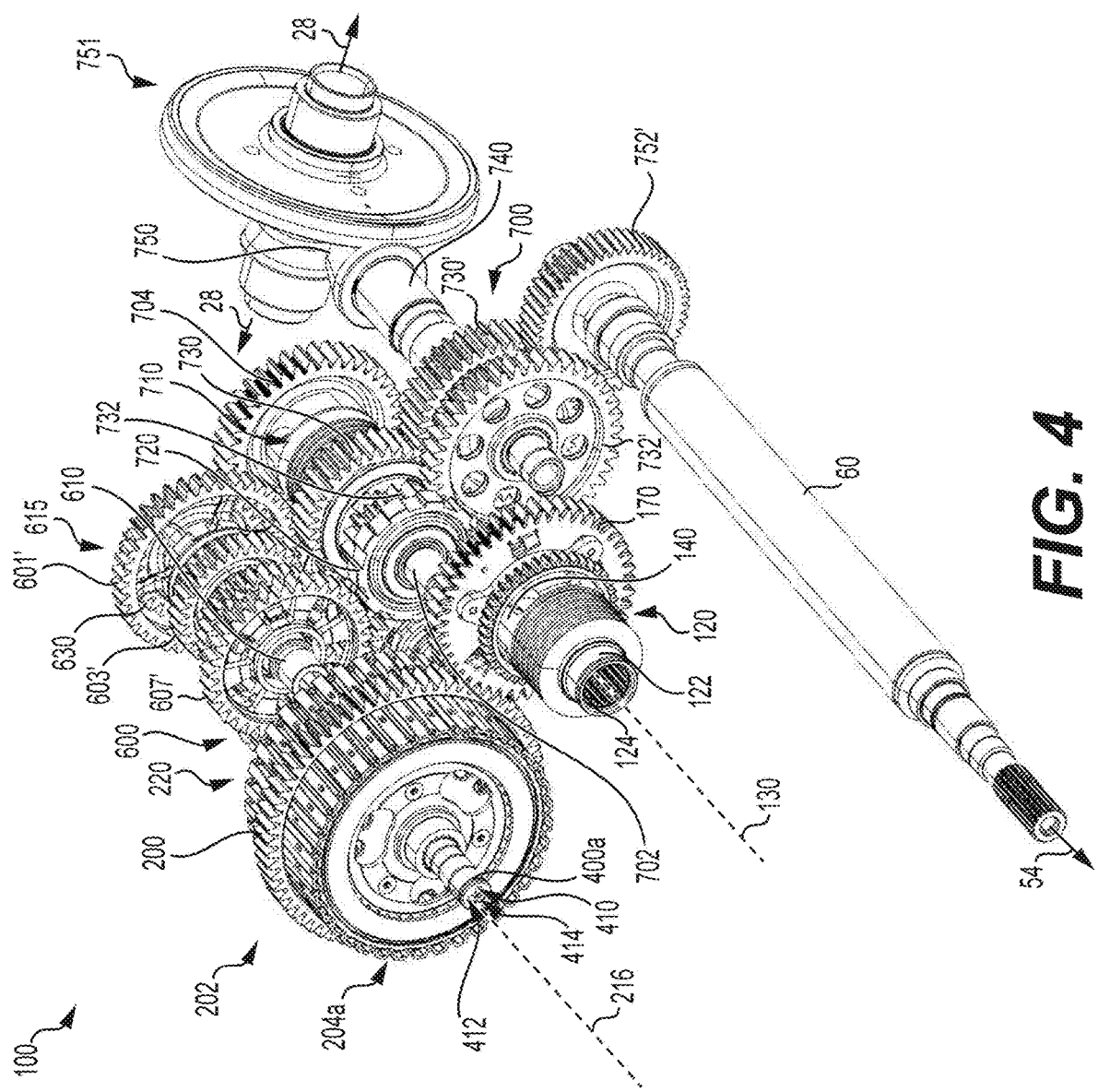
FIG. 4 is a perspective view taken from a top, front, left side of the dual-clutch transmission and front propeller shaft of FIG. 3, with a housing of the dual-clutch transmission removed.
Figure 5:
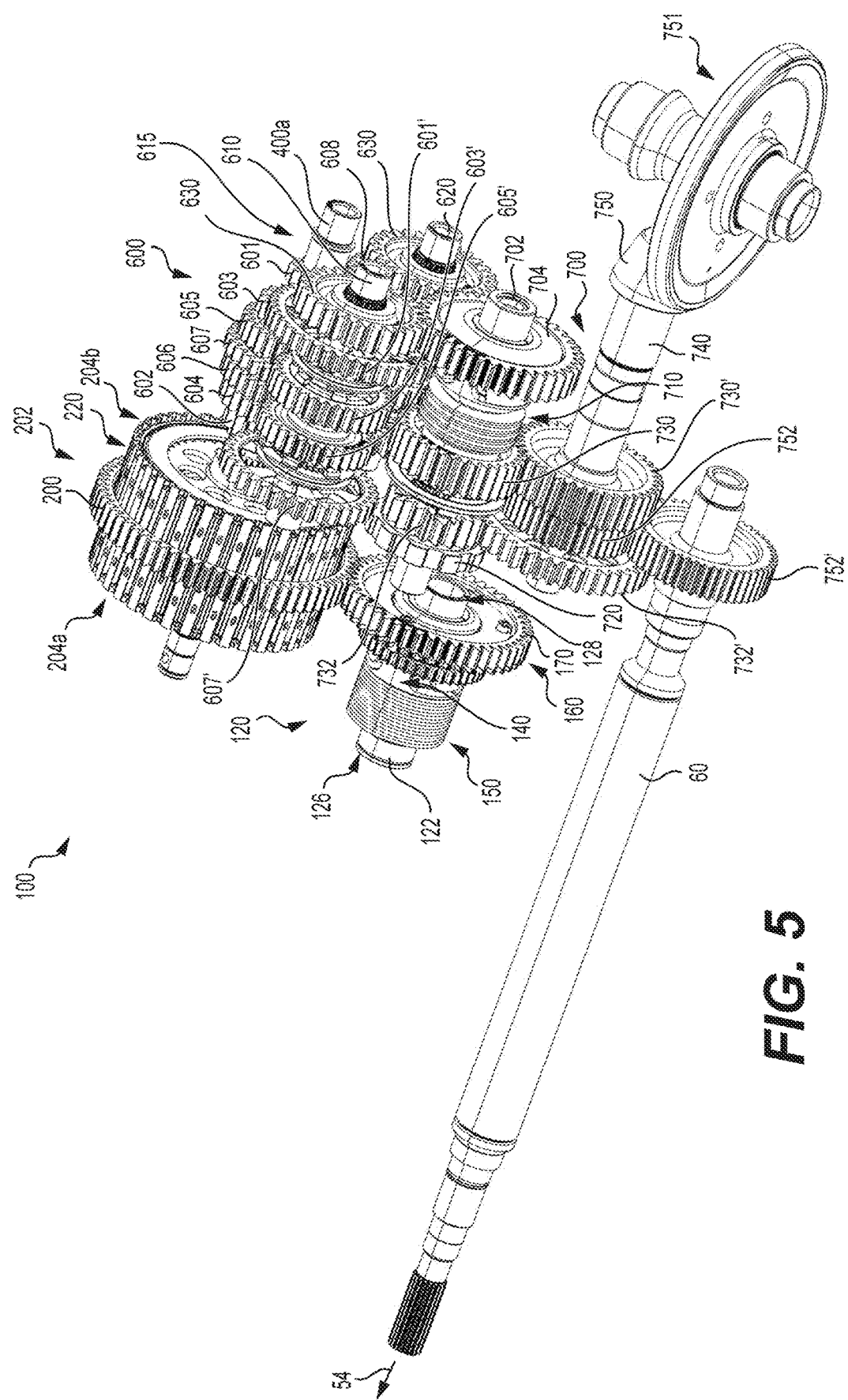
FIG. 5 is a perspective view taken from a top, rear, left side of the dual-clutch transmission and front propeller shaft of FIG. 4.
Figure 6:
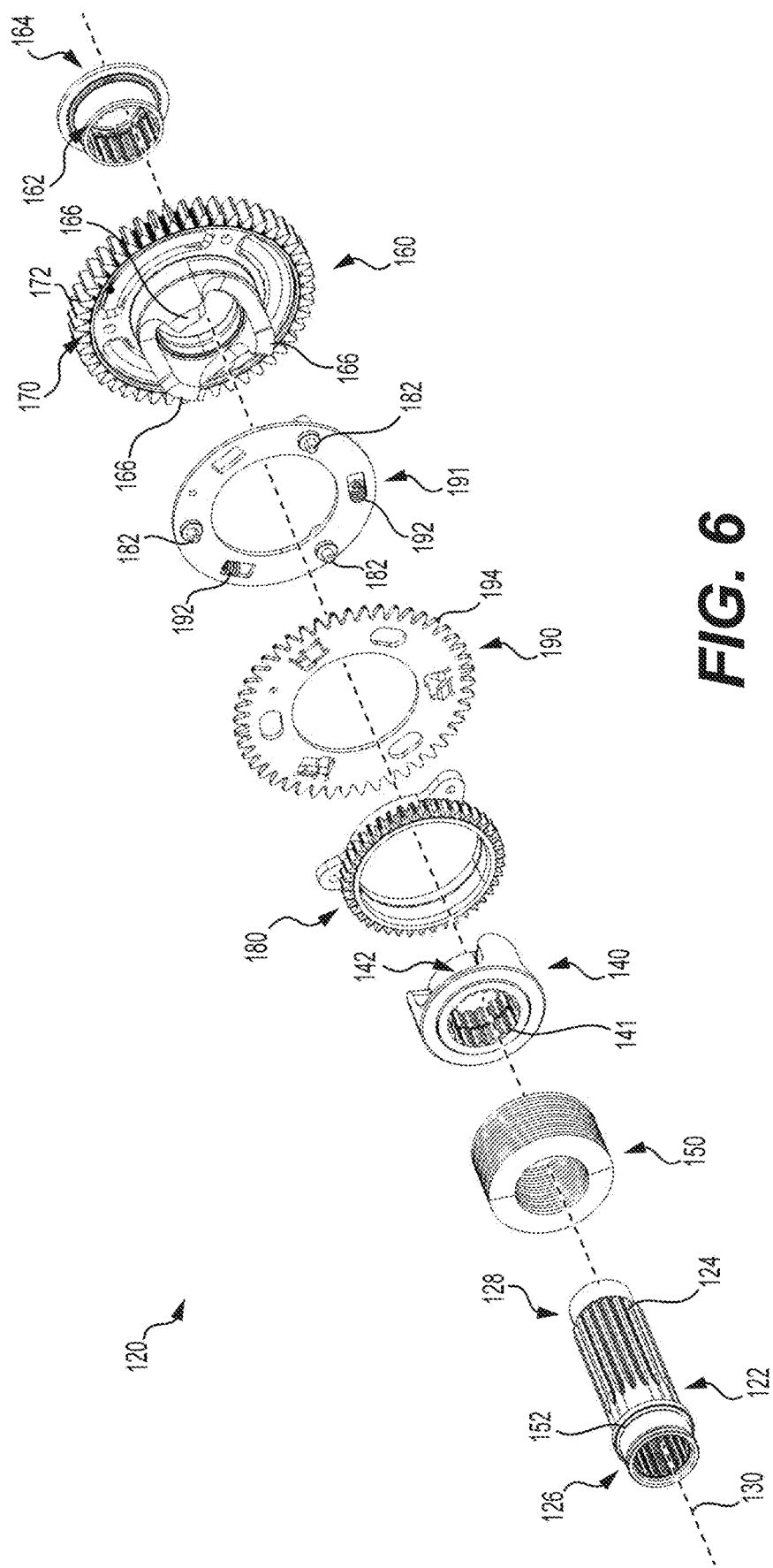
FIG. 6 is an exploded, perspective view taken from a top, front, left side of an input damper of the dual-clutch transmission of FIG. 3.
Figure 8:
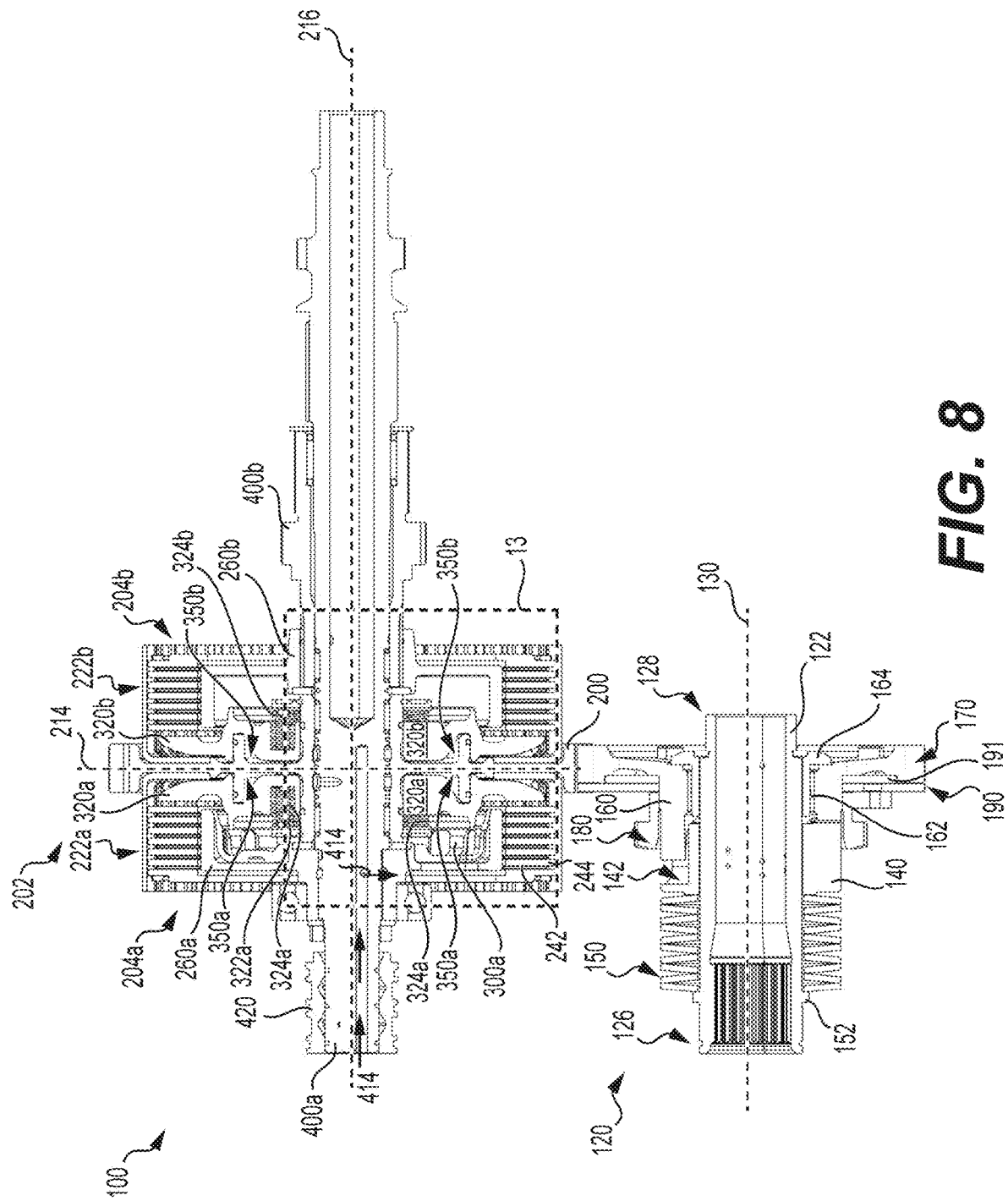
FIG. 8 is a longitudinal cross-sectional view of the dual-clutch and the input damper of the dual-clutch transmission of FIG. 3.

Referring to FIGS. 4 to 6, the DCT 100 includes an input damper 120 adapted to reduce the torque variations from the crankshaft 53 to the DCT 100. The input damper 120 has a hollow shaft 122 defining splines 124 for connection to the crankshaft 53 (as can be understood from FIG. 3). The hollow shaft 122 has a front end 126 and a rear end 128 defined consistently with the forward travel direction of the vehicle 20 (FIGS. 6 and 8). The hollow shaft 122 also defines an input damper axis 130 about which the hollow shaft 122 rotates. An input member 140 is slidably engaged to the hollow shaft 122 and positioned between the front and rear ends 126, 128. The input member 140 has splines 141 complementary to splines 124, and the input member 140 can slide axially along the input damper axis 130 between the front and rear ends 126, 128. The input member 140 defines three recesses 142 angularly displaced by about 120 degrees relative to the input damper axis 130. A disc spring assembly 150 is connected to the hollow shaft 122 and extends between the front and rear ends 126, 128. The disc spring assembly 150 abuts a shoulder 152 of the hollow shaft 122 and biases the input member 140 axially along the input damper axis 130 towards the rear end 128 of the hollow shaft 122. An output member 160 is disposed over the hollow shaft 122 and positioned between the input member 140 and the rear end 128 of the hollow shaft 122. The output member 160 is supported by bearings 162 disposed between the output member 160 and a connector 164 disposed adjacent the rear end 128 of the hollow shaft 122. The connector 164 retains the output member 160 on the hollow shaft 122. The output member 160 defines three cams 166 also angularly displaced by about 120 degrees relative to the input damper axis 130 (FIG. 6). The three cams 166 are structured and configured for engaging the corresponding three recesses 142 of the input member 140 when the input member 140 is biased towards the rear end 128 of the hollow shaft 122. An output gear 170 is connected to the output member 160, and also rotates about the input damper axis 130. The output gear 170 has a plurality of teeth 172. A pump gear 180 is connected to the output gear 170 via three fasteners 182, and extends between the output gear 170 and the disc spring assembly 150. The pump gear 180 also rotates about the input damper axis 130. The pump gear 180 is adapted to drive the transmission fluid pump 104 (FIG. 2). An auxiliary output gear 190 is connected to the output gear 170 via a ring 191 having coil spring assemblies 192. The auxiliary output gear 190 is biased by the coil spring assemblies 192 and has a plurality of teeth 194. In the present implementation, the number of teeth 172 of the output gear 170 matches the number of teeth 194 of the auxiliary output gear 190. The coil spring assemblies 192 permits angular displacements of the auxiliary output gear 190 about the input damper axis 130 relative to the output gear 170. The auxiliary output gear 190 provides preload on the teeth 172 of the output gear 170 and reduces backlash that can occur between the output gear 170 and a central clutch gear 200 described below.

Figure 7:
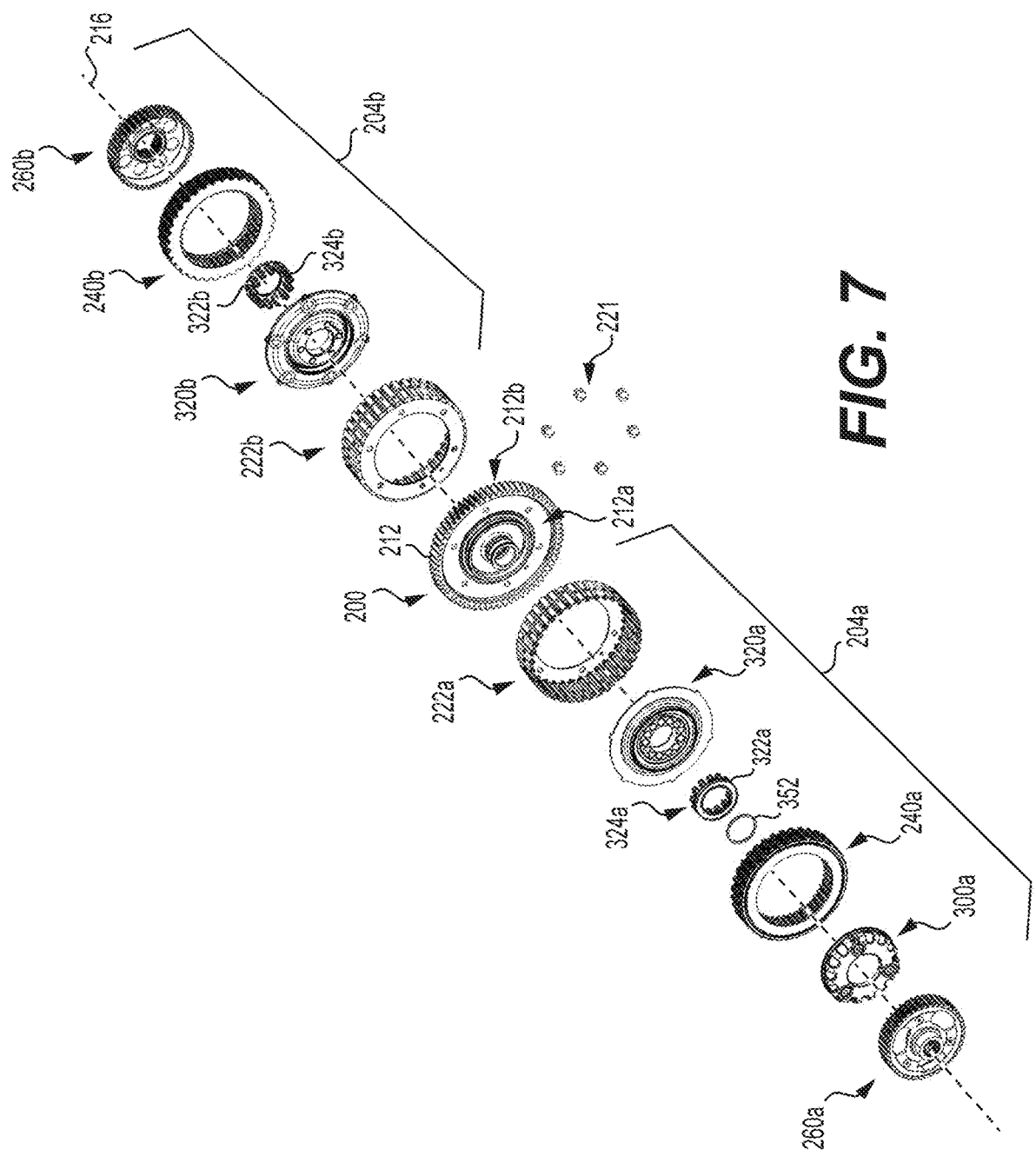
FIG. 7 is an exploded, perspective view taken from a top, front, left side of a dual-clutch of the dual-clutch transmission of FIG. 3.
Figure 9:
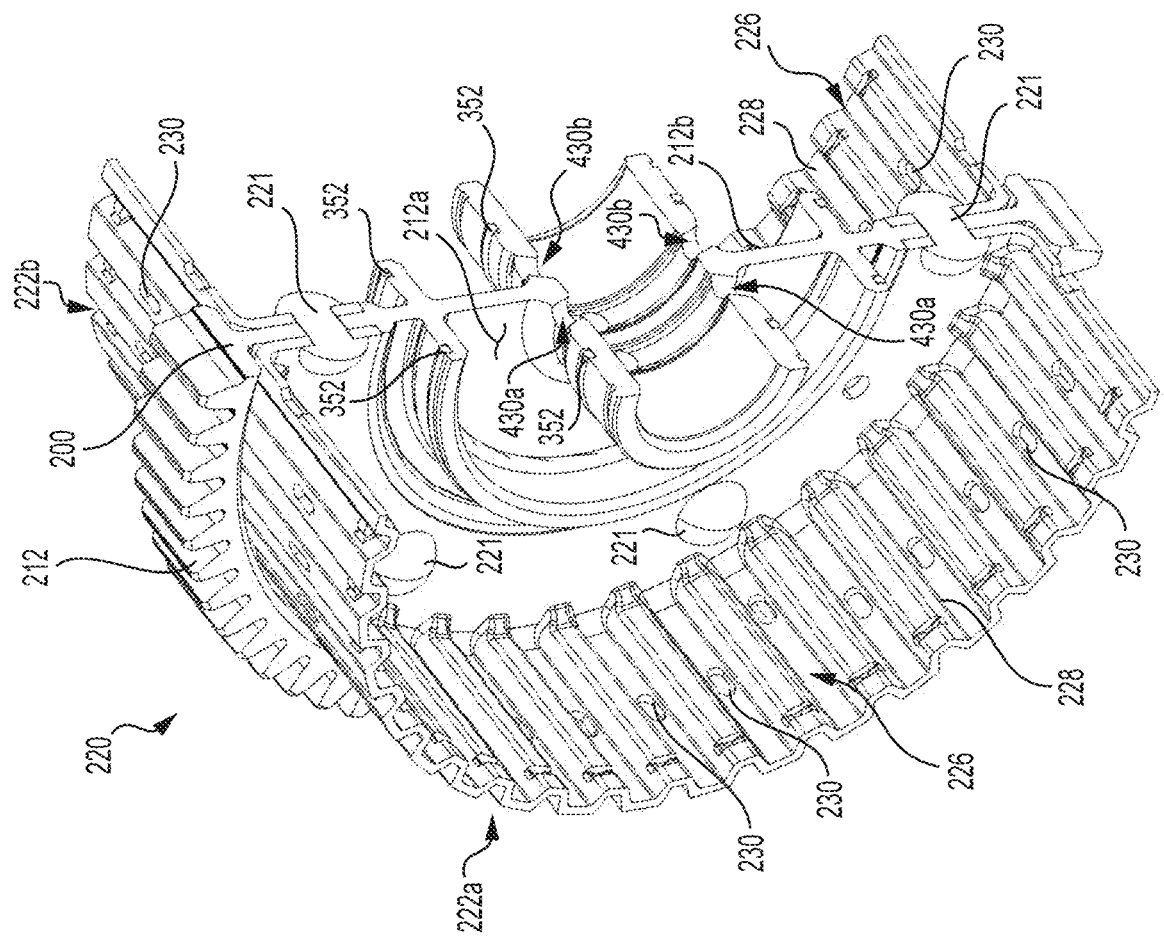
FIG. 9 is a perspective, longitudinal cross-sectional view of the clutch pack drum and the central clutch gear of the dual-clutch of FIG. 7.

Referring to FIGS. 4 to 8, the DCT 100 includes a dual-clutch 202 having first and second clutches 204a, 204b. Before describing in details the first and second clutches 204a, 204b, components of the dual clutch 202 will be described. The dual clutch 202 includes a clutch pack drum 220 that is adapted to rotate inside the housing 102, and the central clutch gear 200 is connected to the clutch pack drum 220 via fasteners 221 (FIGS. 7 and 9). The central clutch gear 200 has teeth 212 adapted to mesh with the teeth 172, 194 of the output gear 170 and the auxiliary output gear 190. The central clutch gear 200 is thus operatively connected to the crankshaft 53 of the internal combustion engine 52 via the input damper 120. It is to be noted that having the input damper 120 located outside the clutch pack drum 220 offers more flexibility to package the DCT 100 in the rear portion of the frame 22 of the vehicle 20 supporting the engine 52 and the DCT 100. Thus, having the input damper 120 located outside the clutch pack drum 220 improves the overall packaging of the DCT 100 in the rear portion of the vehicle 20. Moreover, having the input damper 120 located outside the clutch pack drum 220 allows for a greater angle of relative rotation between the input member 140 and the output member 160 compared to an input damper that would be integrated in the clutch pack drum 220. The greater angle of relative rotation between the input member 140 and the output member 160 improves the damping provided by the input damper 120.

Referring to FIGS. 7 and 9, the central clutch gear 200 has a front face 212a and a rear face 212b. The central clutch gear 200 defines a clutch gear plane 214 and a clutch gear rotation axis 216 normal to the clutch gear plane 214 (FIG. 8). It is to be appreciated that the clutch gear rotation axis 216 is parallel to the input damper axis 130, and extends above and to the right of the input damper axis 130 (FIG. 4).

Referring to FIGS. 7 to 9, the clutch pack drum 220 includes a front clutch pack basket 222a disposed in front of the central clutch gear 200, and a rear clutch pack basket 222b disposed behind the central clutch gear 200. The front and rear clutch pack baskets 222a, 222b are interconnected using the fasteners 221 extending through the central clutch gear 200. The front and rear clutch pack baskets 222a, 222b are identical. In some implementations, the front and rear clutch pack baskets 222a, 222b are symmetrical about the clutch gear plane 214. The front and rear clutch pack baskets 222a, 222b could be structured otherwise in other implementations. Having the front and rear clutch pack baskets 222a, 222b identical, or symmetrical about the clutch gear plane 214, assists in reducing the manufacturing costs of the DCT 100. The front and rear clutch pack baskets 222a, 222b each have a cylindrical wall 226 defining splines 228 and a plurality of holes 230.

Turning now to FIGS. 7 to 13C, the first clutch 204a will be described in details first. The operation of the first and second clutches 204a, 204b, and the flow of fluid through the DCT 100 will be described further below. A front clutch pack 240a is received in the clutch pack basket 222a and is disposed in front of the central clutch gear 200. The clutch pack 240a includes a plurality of clutch plates 242 having teeth 244 extending away from the clutch gear rotation axis 216 and engaging the splines 228 of the clutch pack basket 222a for rotating with the clutch pack drum 220 (FIG. 13A). The clutch plates 242 are movable axially in a direction 246 (see double arrow 246 in FIGS. 13A to 13C) defined by the clutch gear rotation axis 216. The clutch plates 242 have disc surfaces including relatively low friction material. The front clutch pack 240a further includes a plurality of clutch disks 250 disposed alternatingly with the clutch plates 242 in the direction 246 (FIG. 13A). The clutch disks 250 have disc surfaces including a relatively high friction material. The clutch disks 250 have teeth 254 extending towards the clutch gear rotation axis 216. The clutch disks 250 are also movable axially in the direction 246 defined by the clutch gear rotation axis 216. As will become apparent from the description below, when the clutch disks 250 are selectively engaged by the clutch plates 242, the clutch disks 250 rotate with the clutch pack drum 220.

Figure 10:
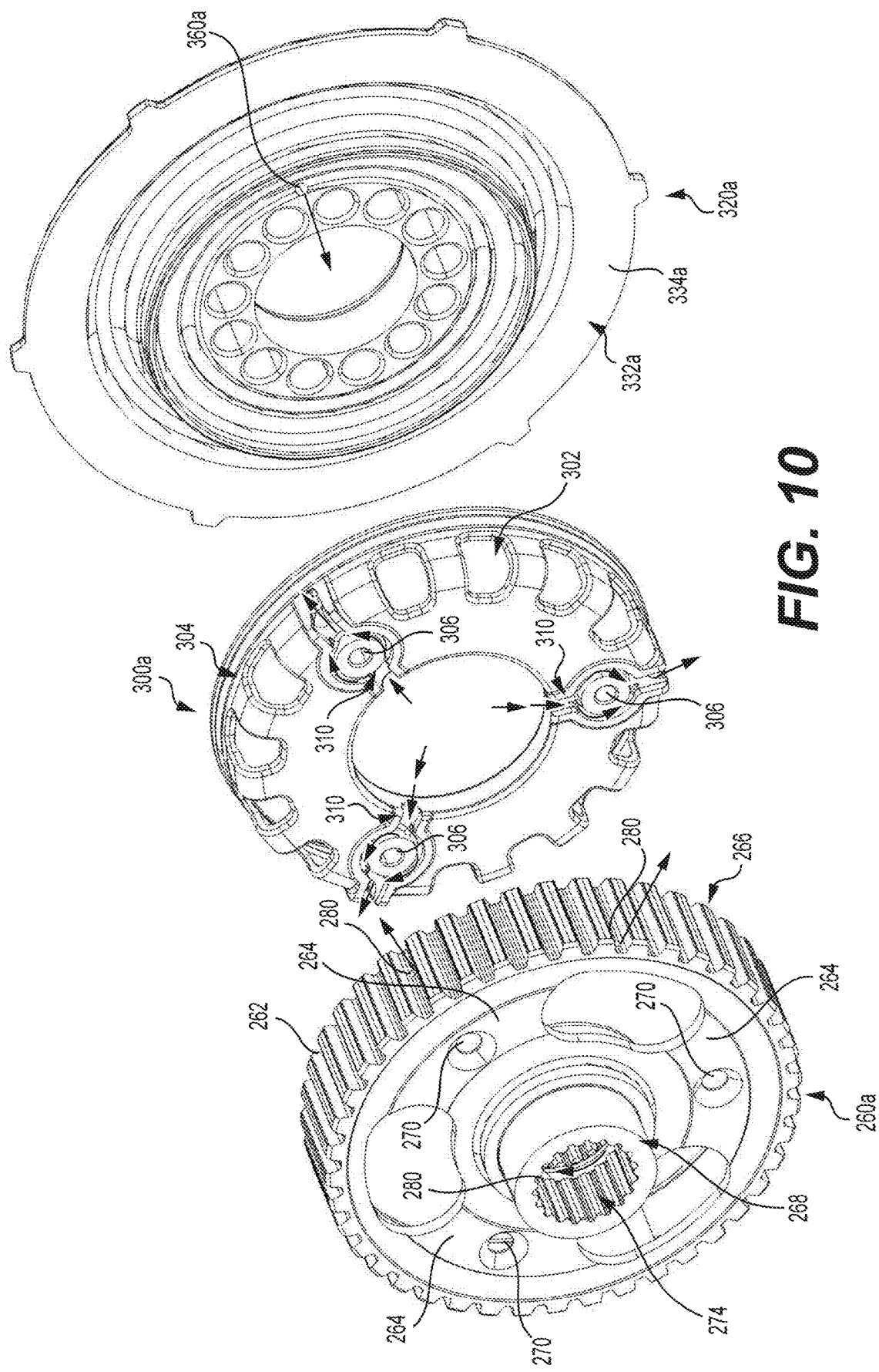
FIG. 10 is an exploded, perspective view taken from a top, front, left side of the front clutch hub, front lubrication cover and front pressure plate of the dual-clutch of FIG. 7.
Figure 11:
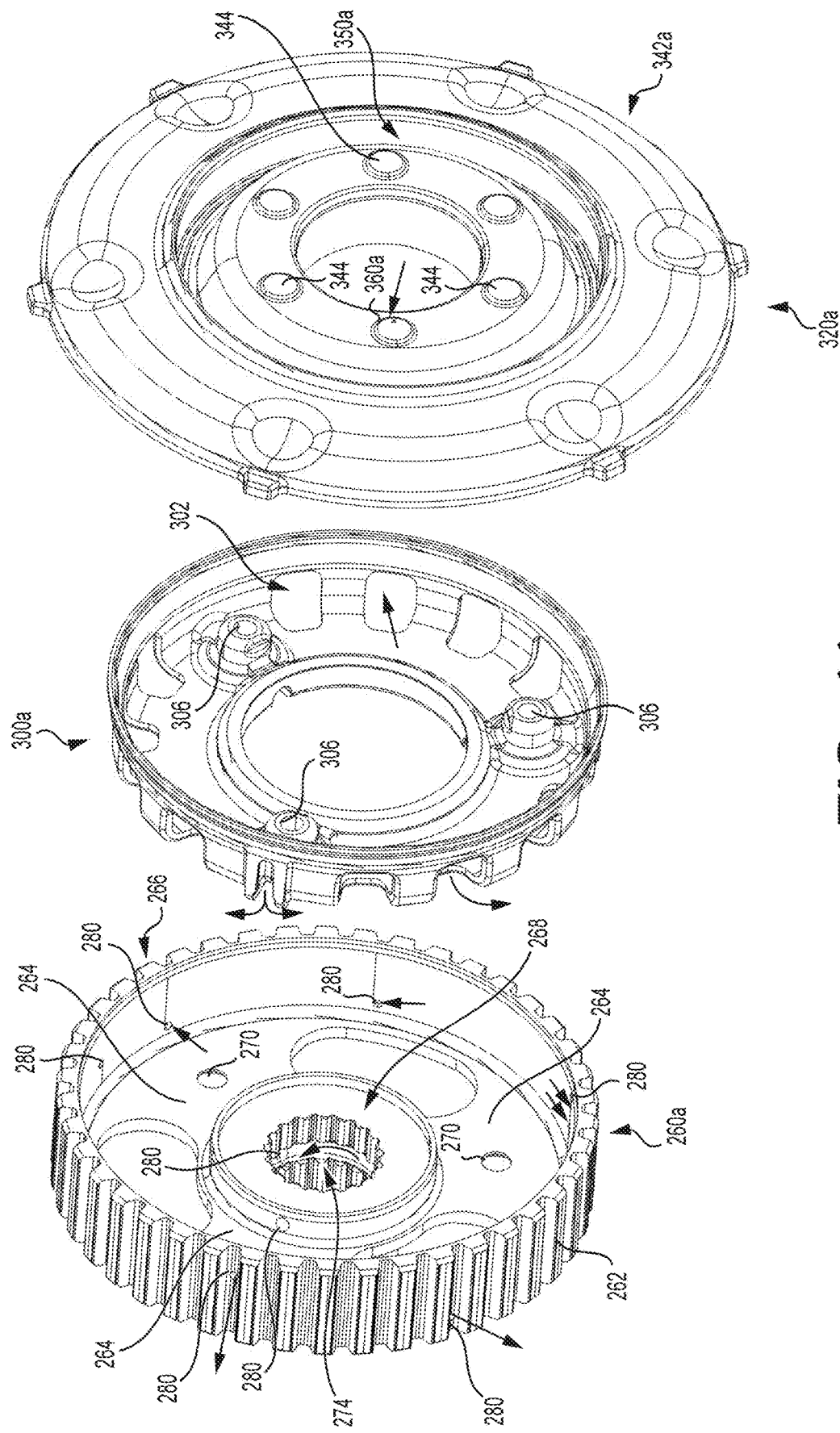
FIG. 11 is an exploded, perspective view taken from a rear, left side of the front clutch hub, front lubrication cover and front pressure plate of the dual-clutch of FIG. 7.
Figure 13A:
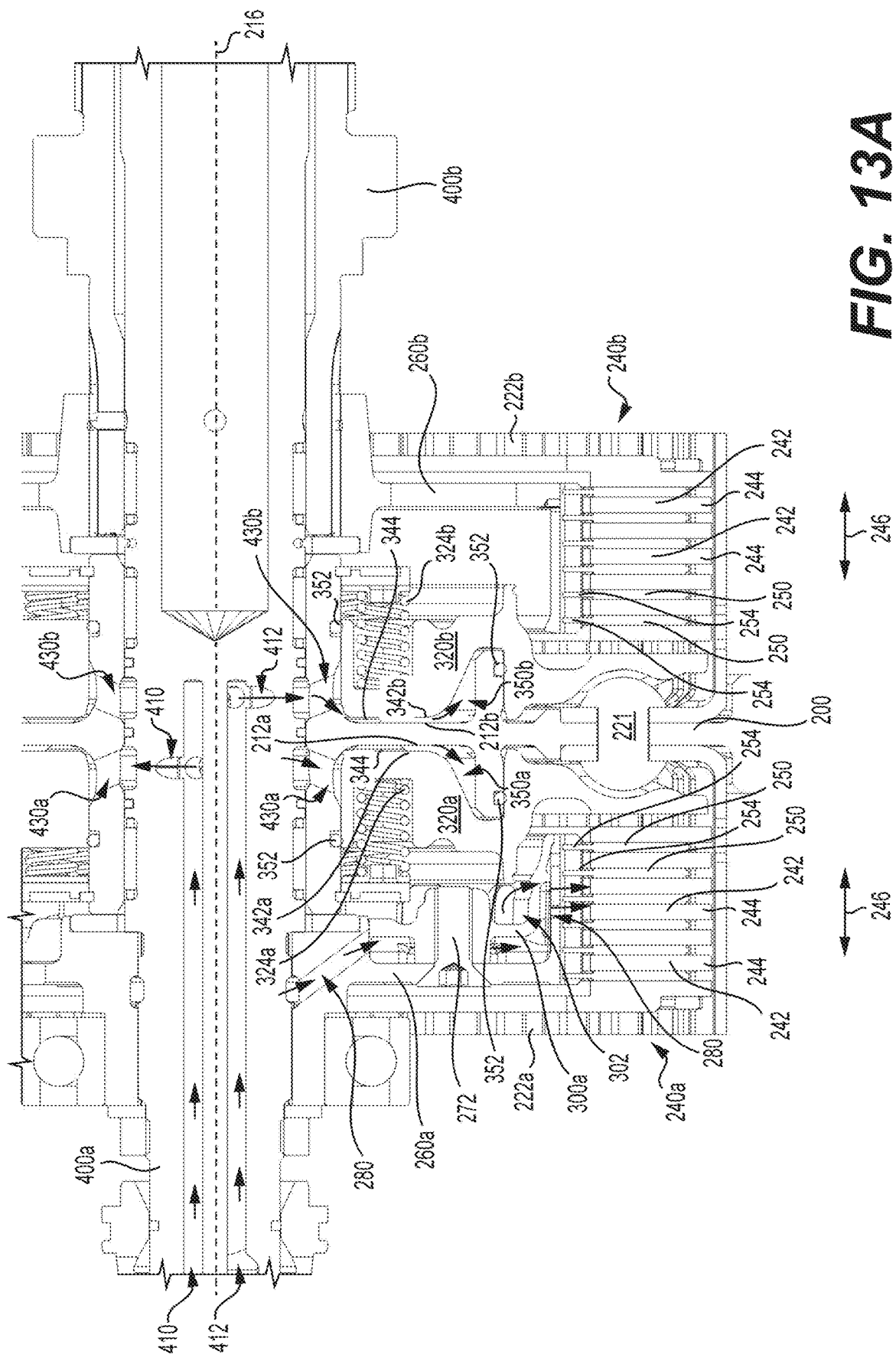
FIG. 13A is a close-up view of portion 13 of FIG. 8, with the front and rear pressure plates abutting the central clutch gear of the dual-clutch of FIG. 7.

Referring to FIGS. 7, 10 and 11, a front clutch hub 260a is received in the clutch pack 240a and is disposed in front of the central clutch gear 200. The clutch hub 260a defines splines 262 structured to engage with the teeth 254 of the clutch disks 250 of the clutch pack 240a. The clutch disks 250 are movable axially relative to the clutch hub 260a in the direction 246 defined by the clutch gear rotation axis 216 as the teeth 254 slide axially in the splines 262. When the clutch disks 250 are selectively engaged by the clutch plates 242, the clutch hub 260a rotates with the clutch pack drum 220. The clutch hub 260a has three arms 264 connecting a rim portion 266 of the clutch hub 260a (defining the splines 262) to a central portion 268 of the clutch hub 260a. Holes 270 are defined in each of the arms 264 for receiving fasteners 272 (FIG. 13A). The central portion 268 defines splines 274. Referring to FIGS. 10, 11 and 13A, a plurality of bores 280 are defined in the central portion 268, in the arms 264 and in the rim portion 266. The bores 280 are adapted for allowing flow of fluid therethrough, as will become apparent from the following description.

Referring to FIGS. 10 and 11, a lubrication cover 300a is also received in the clutch pack 240a. The lubrication cover 300a is disposed in front of the central clutch gear 200 and behind the front clutch hub 260a. The lubrication cover 300a defines a plurality of apertures 302 on a rim portion 304 thereof. Three threaded holes 306 are defined in the lubrication cover 300a for receiving the fasteners 272. When the fasteners 272 extend through the holes 270 of the clutch hub 260a and are engaged in the threaded holes 306 of the lubrication cover 300a, the lubrication cover 300a and the clutch hub 260a are interconnected. Passages 310 are defined in the lubrication cover 300a and extend around each one of the threaded holes 306. The passages 310 are adapted for allowing flow of fluid therethrough, as will become apparent from the following description.

Figure 13B:
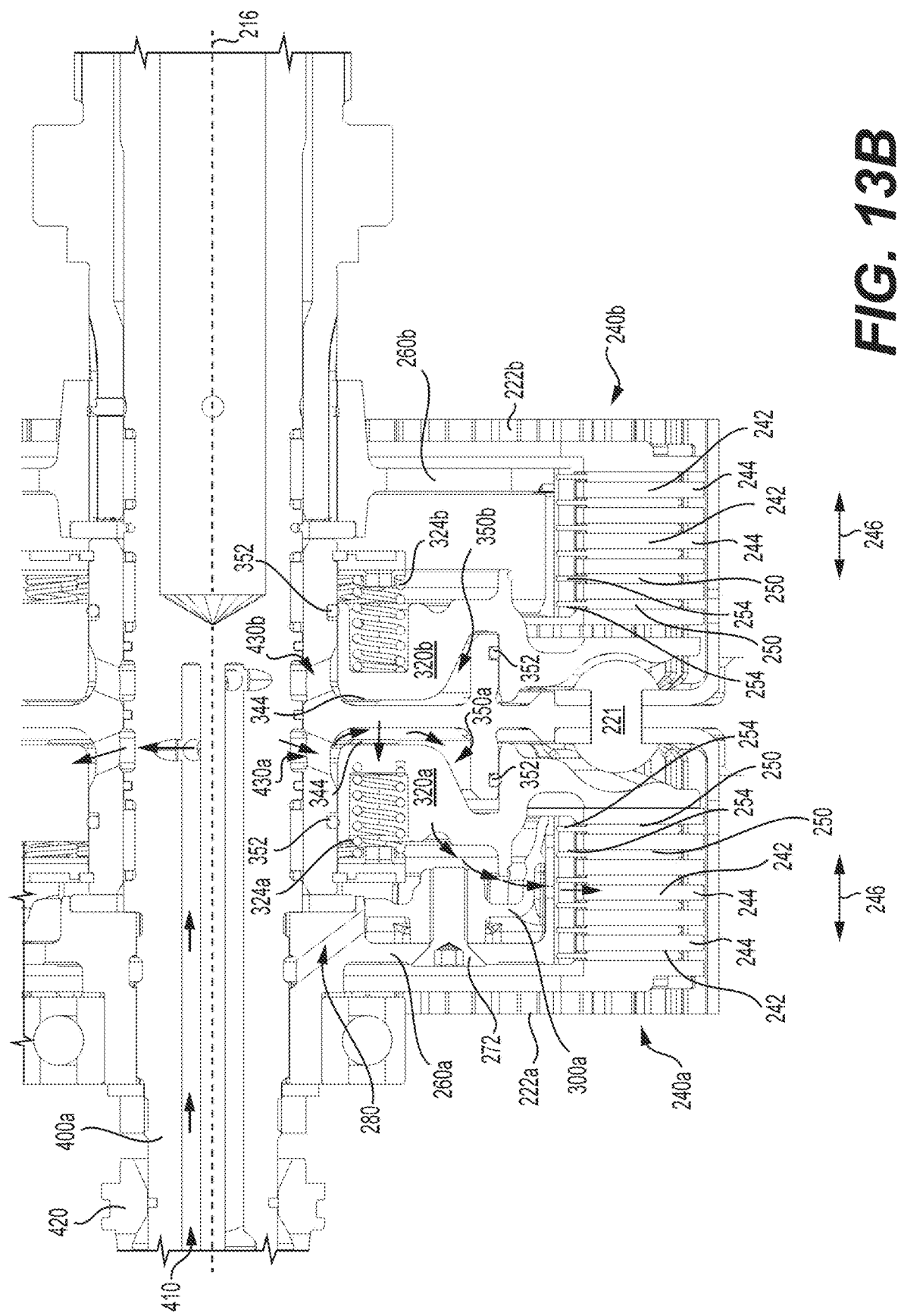
FIG. 13B is a close-up view of portion 13 of FIG. 8, with the front pressure plate being moved axially away from the central clutch gear of the dual-clutch of FIG. 7, and with the rear pressure plate abutting the central clutch gear.
Figure 13C:
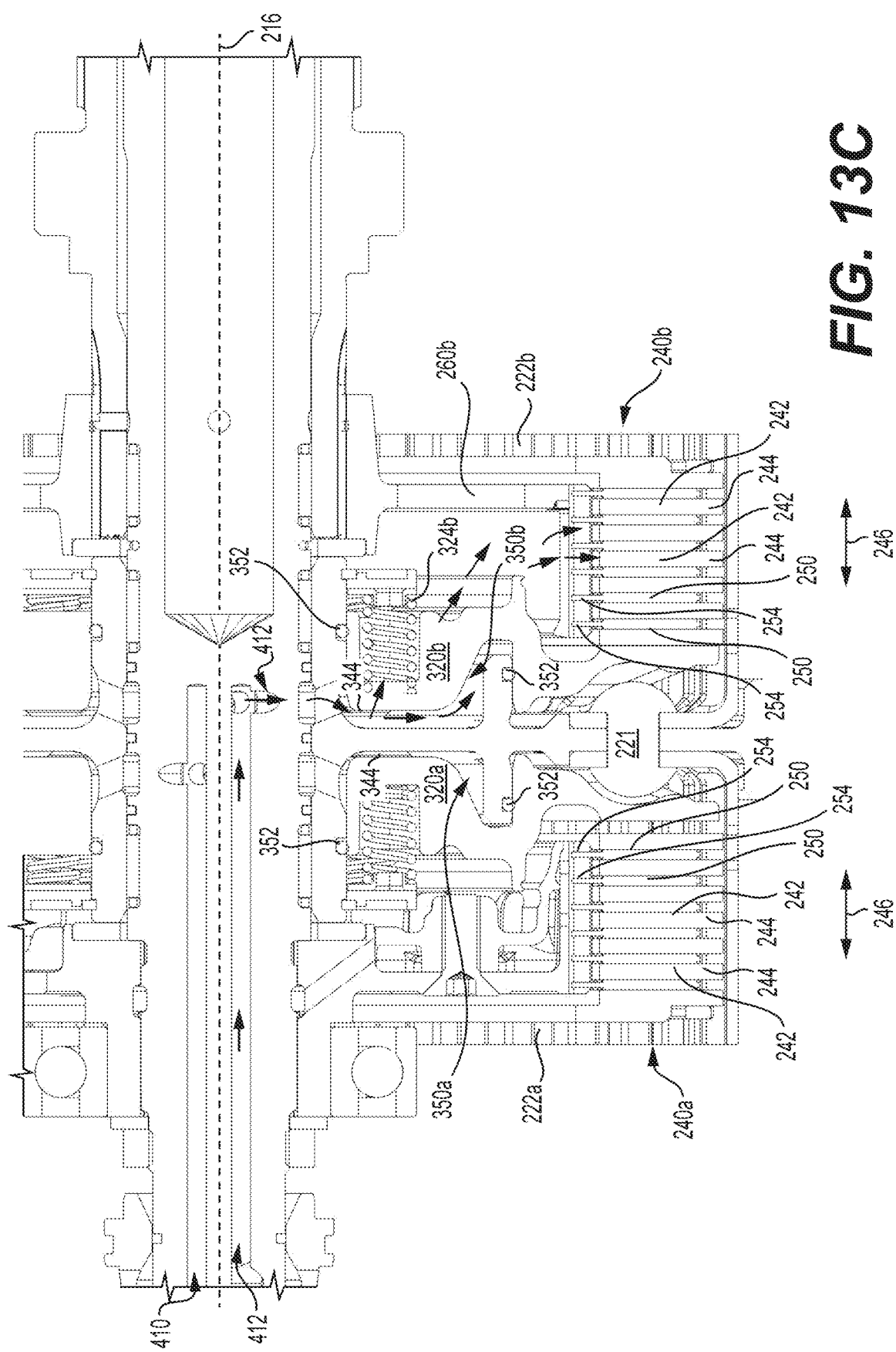
FIG. 13C is a close-up view of portion 13 of FIG. 8, with the rear pressure plate being moved axially away from the central clutch gear of the dual-clutch of FIG. 7, and with the front pressure plate abutting the central clutch gear.

Referring to FIGS. 7, 10, 11 and 13A, the DCT 100 further includes a pressure plate 320a disposed in front of the central clutch gear 200. The pressure plate 320a is disposed between the central clutch gear 200 and the lubrication cover 300a. A ring 322a is connected to the central clutch gear 200, and coil spring assemblies 324a interconnect the pressure plate 320a to the central clutch gear 200. The pressure plate 320a rotates with the central clutch gear 200, and is movable axially in the direction 246 upon compression and extension of the coil spring assemblies 324a. The pressure plate 320a has a front face 332a (FIG. 10) including a rim portion 334a. The rim portion 334a of the pressure plate 320a is structured to selectively engage the clutch plate 242 that is closest to the central clutch gear 200. The pressure plate 320a further has a rear face 342a (FIG. 11) where six pads 344 project therefrom. The pads 344 are structured for abutting the front face 212a of the central clutch gear 200 and to leave a spacing between the front face 212a of the central clutch gear 200 and the rear face 342a of the pressure plate 320a (the spacing is shown in FIG. 13A). Referring to FIGS. 13A to 13C, a chamber 350a is defined between the front face 212a of the central clutch gear 200 and the rear face 342a of the pressure plate 320a. Seals 352 are disposed between the pressure plate 320a and the central clutch gear 200 to prevent fluid from escaping the chamber 350a through the regions where the seals 352 extend. The pressure plate 320a further defines a pressure plate passage 360a extending between the front face 332a and the rear face 342a. More particularly, the pressure plate passage 360a starts on the rear face 342a from one of the pads 344 (FIG. 11). The pressure plate passage 360a is adapted for allowing flow of fluid therethrough, as will become apparent from the following description.

Figure 14:
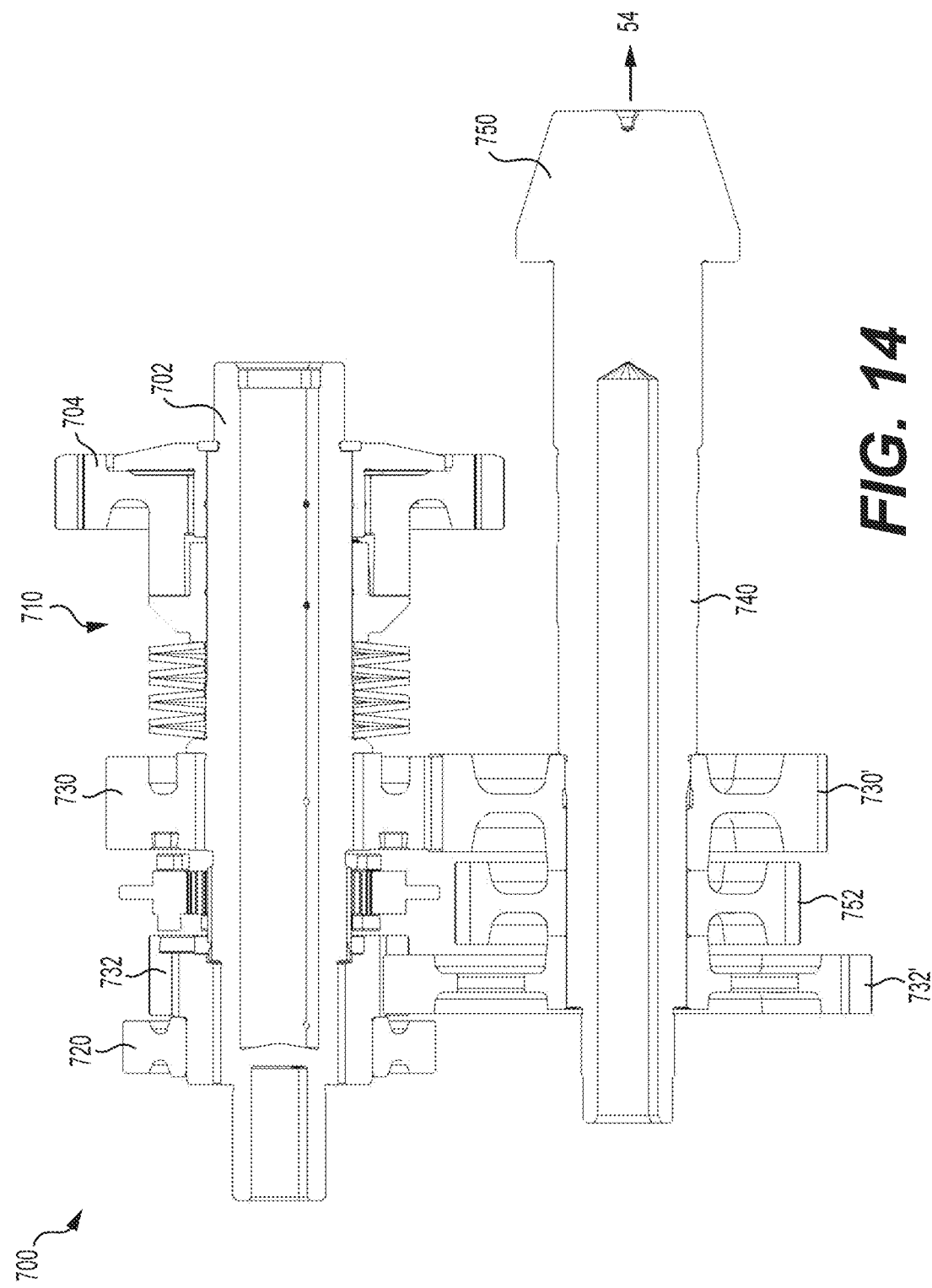
FIG. 14 is a longitudinal cross-sectional view of a sub-transmission of the dual-clutch transmission of FIG. 3.

Referring to FIGS. 4, 8, and 13A, a shaft 400a is connected to the front clutch hub 260a via teeth (not shown) engaging the splines 274 of central portion 268. The shaft 400a is coaxial with the clutch gear rotation axis 216. The shaft 400a defines three passages 410, 412 (FIG. 13A), and 414 (FIG. 8) adapted for flowing fluid therethrough. A manifold 420 (FIG. 8) is connected to the front portion of the shaft 400a. The manifold 420 fluidly connects the transmission fluid pump 104 to the passages 410, 412, 414. Three plugs (not shown) seal the ends of the passages 410, 412, 414 defined in the front portion of the shaft 400*a* (FIG. 4). Referring to FIGS. 4, 5 and 14, a plurality of transmission gears 600 are operatively connected to the shaft 400*a*. The transmission gears 600 include the gears corresponding to the first gear 601, third gear 603, fifth gear 605, and seventh gear 607 of the DCT 100. The transmission gears 600 are all disposed behind the central clutch gear 200.

Arrows show the flow of fluid through the dual-clutch 202 in FIGS. 10, 11, 13A and 13B when the dual-clutch 202 rotates. When fluid is selectively supplied in the passage 410 from the transmission fluid pump 104, fluid flows through the shaft 400*a* in the passage 410 (FIG. 13A), through passages 430*a* defined in the central clutch gear 200 (FIGS. 9 and 13A) and into the chamber 350*a*. Since the pads 344 abut the front face 212*a* of the central clutch gear 200, fluid flows through the spacing between the pressure plate 320*a* and the central clutch gear 200, and fills the chamber 350*a*. The pads 344 are thus structured for selectively allowing flow of fluid from the passage 410 to the chamber 350*a*. When the fluid is selectively supplied with sufficient pressure by the transmission fluid pump 104, the pressurized fluid in the chamber 350*a* overcomes the biasing force of the coil spring assemblies 324*a* and moves the pressure plate 320*a* axially away from the central clutch gear 200 (i.e. forward of the central clutch gear 200), as shown between FIGS. 13A and 13B. The pressure plate 320*a* selectively squeezes the clutch plates 242 and the clutch disks 250 together for engaging the clutch plates 242 with the clutch disks 250. The front clutch hub 260*a* and the lubrication cover 300*a* are thus rotatable with the clutch pack drum 220 and the central clutch gear 200, and the shaft 400*a* drives the transmission gears 600 corresponding to the first gear 601, third gear 603, fifth gear 605 and seventh gear 607 of the DCT 100.

Referring to FIG. 13B, as some of the fluid escapes the chamber 350*a* through the pressure plate passage 360*a* (as shown by the arrows in FIG. 13B), fluid flows in the front clutch pack 240*a* and lubricates and cools the clutch plates 242, the clutch disks 250, and the clutch pack basket 222*a*, as shown by arrows in FIG. 13B. Fluid flows through the holes 230 of the clutch pack basket 222*a*, is collected in the housing 102 and is returned to the transmission fluid pump 104 for recirculation in the DCT 100. It is thus to be understood that in order for the pressure plate 320*a* to selectively squeeze the clutch pack 240*a*, pressurized fluid is continuously supplied in the chamber 350*a* by the transmission fluid pump 104.

Referring to FIG. 13A, when fluid is selectively supplied in the passage 414 (FIG. 8) and as the first clutch 204*a* rotates, fluid flows through the shaft 400*a*, through the bores 280 defined in the central portion 268, in the arms 264 and in the rim portion 266 of the front clutch hub 260*a*, and through the aperture 302 and passages 310 defined in the lubrication cover 300*a*, and on to the front clutch pack 240*a*, as shown by arrows in FIG. 13A. The fluid flowing through the passage 414 provides additional lubrication and cooling to the clutch plates 242, the clutch disks 250, and the clutch pack basket 222*a* of the first clutch 204*a*. Since the first clutch 204*a* is operatively connected to the transmission gear 600 corresponding to the first gear 601 of the DCT 100, which can have a heavy usage, for example, when the vehicle 20 launches repetitively, additional lubrication and cooling to the first clutch 204*a* provided by fluid flowing through the passage 414 and the bore 280 is advantageous under certain conditions.

Figure 12:
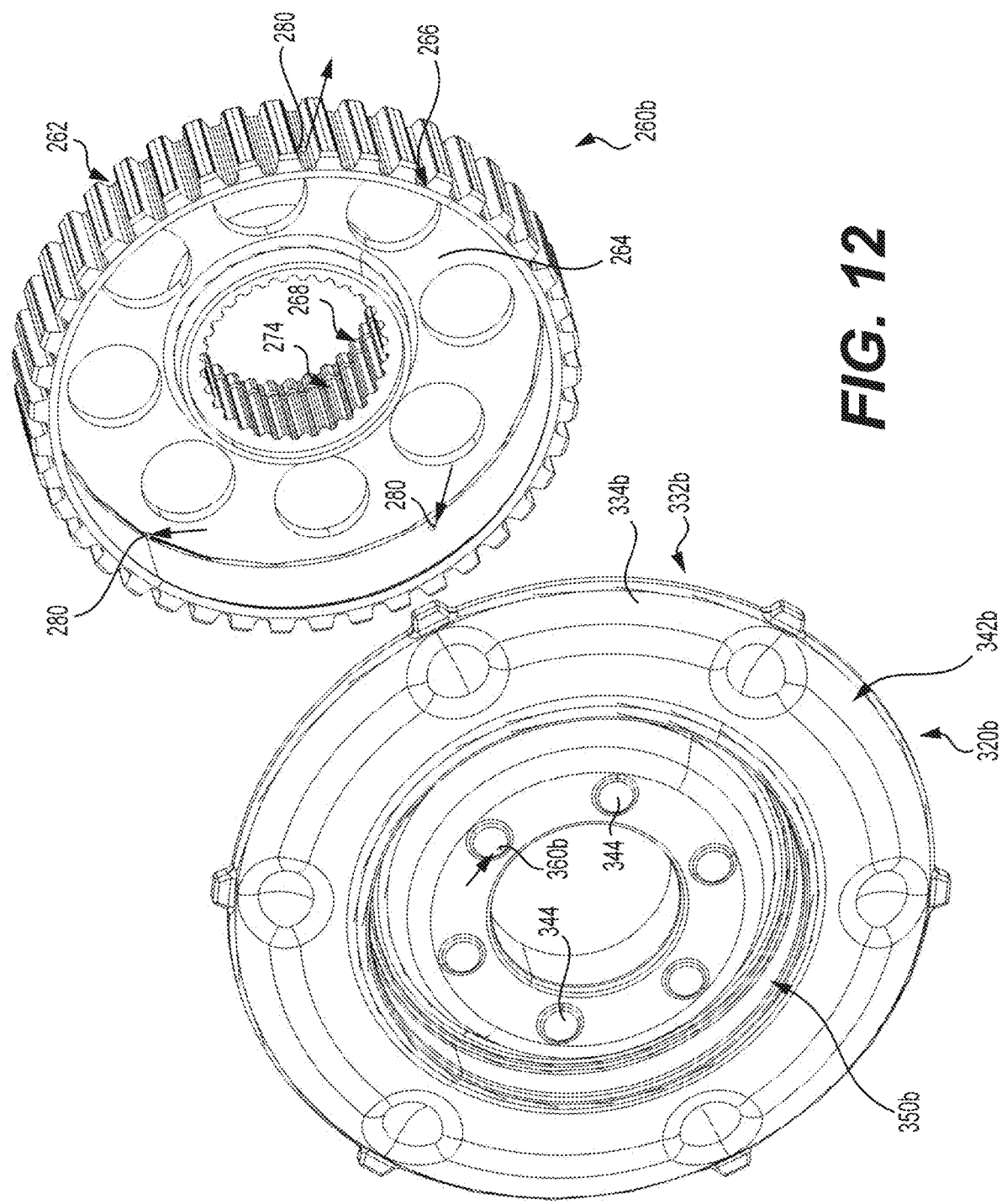
FIG. 12 is an exploded, perspective view taken from a top, front, left side of the rear pressure plate and rear clutch hub of the dual-clutch of FIG. 7.

Referring to FIGS. 7, 8 and 12, the second clutch 204*b* will now be described. A rear clutch pack 240*b* is received in the clutch pack basket 222*b* and is disposed behind the central clutch gear 200. The rear clutch pack 240*b* also includes a plurality of clutch plates 242 having teeth 244 extending away from the clutch gear rotation axis 216 and engaging the splines 228 of the clutch pack basket 222*b* for rotating with the clutch pack drum 220 (FIGS. 13A to 13C). In the present implementations, the front and rear clutch packs 240*a*, 240*b* are identical, but they could be structured otherwise in other implementations. This feature assists in reducing the manufacturing costs of the DCT 100. The clutch plates 242 have disc surfaces including a relatively low friction material. The rear clutch pack 240*b* further includes a plurality of clutch disks 250 disposed alternatingly with the clutch plates 242 in the direction 246 (FIG. 13A). The clutch disks 250 have disc surfaces including a relatively high friction material. The clutch disks 250 have teeth 254 extending towards the clutch gear rotation axis 216 (FIGS. 13A to 13C). The clutch disks 250 are also movable axially in the direction 246 defined by the clutch gear rotation axis 216.

Referring to FIGS. 7 and 12, a rear clutch hub 260*b* is received in the clutch pack 240*b* and is disposed behind the central clutch gear 200. The clutch hub 260*b* also defines splines 262 structured to engage with the teeth 254 of the clutch disks 250 of the clutch pack 240*b*. The clutch disks 250 are movable axially relative to the clutch hub 260*b* in the direction 246 (FIGS. 13A to 13C). When the clutch disks 250 are selectively engaged by the clutch plates 242, the clutch hub 260*b* rotates with the clutch pack drum 220. The clutch hub 260*b* has eight arms 264 connecting a rim portion 266 of the clutch hub 260*b* to the central portion 268 of the clutch hub 260*b*. The central portion 268 defines splines 274. Referring to FIG. 12, a plurality of bores 280 are also defined in the central portion 268, in the arms 264 and in the rim portion 266 of the clutch hub 260*b*. The bores 280 are adapted for allowing flow of fluid therethrough, as will become apparent from the following description.

Referring to FIGS. 7 and 12, the DCT 100 further includes a pressure plate 320*b* disposed behind the central clutch gear 200. The pressure plate 320*b* is disposed between the central clutch gear 200 and the clutch hub 260*b*. A ring 322*b* (FIG. 7) is connected to the central clutch gear 200, and coil spring assemblies 324*b* interconnect the pressure plate 320*b* to the central clutch gear 200. It is to be noted that the rings 322*a*, 322*b* are identical, and that the spring assemblies 324*a*, 324*b* are identical. These features assist in reducing the manufacturing costs of the DCT 100. The pressure plate 320*b* rotates with the central clutch gear 200, and is movable axially in the direction 246 upon compression and extension of the coil spring assemblies 324*b*. The pressure plate 320*b* has a rear face 332*b* including a rim portion 334*b*. The rim portion 334*b* of the pressure plate 320*a* is structured to selectively engage the clutch plate 242 of the rear clutch pack 240*b* that is closest to the central clutch gear 200. The pressure plate 320*b* further has a front face 342*b* where six pads 344 project therefrom. The pads 344 are structured for abutting the rear face 212*b* of the central clutch gear 200 and to leave a spacing defined between the rear face 212*b* of the central clutch gear 200 and the front face 342*b* of the pressure plate 320*b* (FIG. 13A). A chamber 350*b* is defined between the rear face 212*b* of the central clutch gear 200 and the front face 342*b* of the pressure plate 320*b*. Seals 352 are also disposed between the pressure plate 320*b* and the central clutch gear 200 to prevent fluid from escaping the chamber 350*b* through the regions where the seals 352 extend. The pressure plate 320*b* further defines a pressure plate passage 360*b* (FIG. 12) extending between the rear face 332*b* and the front face 342b. More particularly, the pressure plate passage 360b starts on the front face 342b from one of the pads 344. The pressure plate passage 360b is adapted for allowing flow of fluid therethrough, as will become apparent from the following description.

It is to be appreciated that in the illustrated implementation, the pressure plates 320a, 320b are identical. In some implementations, the pressure plates 320a, 320b are symmetrical about the clutch gear plane 214. These features assist in reducing the manufacturing costs of the DCT 100. Furthermore, there is no component similar to the lubrication cover 300a in the second clutch 204b.

Referring to FIGS. 13A to 13C, arrows show the flow of fluid through the dual-clutch 202 when the dual-clutch 202 rotates and fluid is selectively supplied in the passages 410, 412, 414. When fluid is selectively supplied in the passage 412 of the shaft 400a, fluid flows through the shaft 400a in the passage 412 (FIGS. 13A and 13C), through passages 430b defined in the central clutch gear 200 (FIG. 9) and into the chamber 350b. Since the pads 344 abut the rear face 212b of the central clutch gear 200, fluid flows through the spacing between the pressure plate 320b and the central clutch gear 200, and fills the chamber 350b. The pads 344 are thus structured for selectively allowing flow of fluid from the passage 412 to the chamber 350b. When the fluid is selectively supplied with sufficient pressure, the pressurized fluid in the chamber 350b overcomes the biasing force of the coil spring assemblies 324b and moves the pressure plate 320b axially away from the central clutch gear 200 (i.e. rearward of the central clutch gear 200), as shown between FIGS. 13A and 13C. The pressure plate 320b selectively squeezes the clutch plates 242 and the clutch disks 250 together for engaging the clutch plates 242 with the clutch disks 250. The rear clutch hub 260b is thus rotatable with the clutch pack drum 220 and the central clutch gear 200. As some of the fluid escapes the chamber 350b through the pressure plate passage 360b, fluid flows in the rear clutch pack 240b and lubricates and cools the clutch plates 242, the clutch disks 250, and the clutch pack basket 222b, as shown by arrows in FIG. 13C. Fluid flows through the holes 230 of the clutch pack basket 222b, is collected in the housing 102 and is returned to the transmission fluid pump 104 for recirculation in the DCT 100. It is thus to be understood that in order for the pressure plate 320b to selectively squeeze the clutch pack 240b, pressurized fluid is continuously supplied by the transmission fluid pump 104.

Furthermore, it is to be noted that in the DCT 100 of the present technology, having the central clutch gear 200 between the pressure plates 320a, 320b, and thus the chambers 350a, 350b on either side of the central clutch gear 200, assists in distributing the forces more evenly in the clutch pack drum 220. This feature also assists in reducing the rotating masses in the clutch pack drum 220.

Referring to FIG. 8, a hollow shaft 400b is connected to the rear clutch hub 260b via the splines 274 defined in the central portion 268 thereof. The shaft 400a extends through the shaft 400b. Another plurality of transmission gears 600 are operatively connected to the shaft 400b. Referring to FIG. 5, the transmission gears 600 include the gears corresponding to the second gear 602, fourth gear 604 and sixth gear 606 of the DCT 100, and the transmission gears 600 are also disposed behind the central clutch gear 200.

Referring back to FIGS. 4 and 5, the DCT 100 further includes a layshaft 610 having additional transmission gears 601', 603', 605', 607' operatively connected thereto. Each of the transmission gears 601', 603', 605', 607' on the layshaft 610 is selected to have a gear ratio with the corresponding transmission gear 601, 603, 605, 607 to correspond to the first, third, fifth and seventh gear of the DCT 100. The DCT 100 further includes another layshaft 620 having additional transmission gears (not shown) operatively connected thereto. Each of the transmission gears on the layshaft 620 is selected to have a gear ratio with the corresponding transmission gear 602, 604, 606 to correspond to the second, fourth and sixth gear of the DCT 100. The layshaft 620 further includes the transmission gear 608 corresponding to a reverse gear of the DCT 100. An output gear 630 is operatively connected to each of the layshafts 610, 620 to operatively connect the transmission gears 600 to the subtransmission 700. The transmission gears 600 mounted to the shafts 400a, 400b and the transmission gears mounted to the layshafts 610, 620 define a main transmission 615 of the DCT 100.

The DCT 100 further includes synchronizers, shift actuators and shift forks adapted to preselect an odd transmission gear on the shaft 400a while the vehicle 20 is being driven in an even transmission gear on the shaft 400b (and vice versa), and thus enable the driver to operate transmission gear changes when the driver operates the gear shifter 56.

Referring now to FIGS. 4, 5 and 14, the subtransmission 700 will be described in more details. The subtransmission 700 has an input shaft 702. An input gear 704 is operatively connected to the input shaft 702 via an output damper 710. The input gear 704 is selectively driven by the output gear 630 of the layshaft 610, or by the output gear 630 of the layshaft 620, depending on the transmission gear that is selected. As such, the subtransmission 700 is operatively connected to the main transmission 615 via the input gear 704 and the output gears 630. The output damper 710 is operatively connected between the input gear 704 and the input shat 702. The output damper 710 has components similar to the input damper 120, and can reduce backlash that can occur between the driveline 54 of the vehicle 20 and the DCT 100. A parking lock gear 720 is operatively connected to the input shaft 702, and is adapted to lock the subtransmission 700, and thus the vehicle 20, when selected. The subtransmission 700 further includes a high transmission gear 730 and a low transmission gear 732 operatively connected to the input shaft 702. The high transmission gear 730 and the low transmission gear 732 are selectively engageable to place the subtransmission 700 in a "high gear setting" and a "low gear setting" respectively.

The subtransmission 700 further includes an output shaft 740 configured for operative connection to the driveline 54 of the vehicle 20 (as shown by arrow 54 in FIGS. 4, 5 and 14). The output shaft 740 includes a high transmission gear 730' and a low transmission gear 732' operatively connected thereto. When the subtransmission 700 is in the high gear setting (i.e. when the high transmission gear 730 drives the high transmission gear 730'), a first gear ratio is defined between the input shaft 702 and the output shaft 740. When the subtransmission 700 is in the low gear setting (i.e. when the low transmission gear 732 drives the low transmission gear 732'), a second gear ratio is defined between the input shaft 702 and the output shaft 740. The first gear ratio (i.e. high gear ratio) is smaller than the second gear ratio (i.e. low gear ratio). The driver can thus select in which mode the subtransmission 700 is to be configured, i.e. between high gear ratio and low gear ratio, depending on the terrain on which the vehicle 20 travels, for example.

The output shaft 740 further has a bevel gear 750 defined in the rear portion thereof. The bevel gear 750 is adapted to operatively connect to a rear transaxle 751 of the vehicle 20 for driving the rear wheels 28 (as indicated by arrows 28 on FIG. 4). A front propeller shaft gear 752 is operatively connected to the output shaft 740, and is adapted to engage with a front propeller shaft gear 752' operatively connected to the front propeller shaft 60. As mentioned above, the front propeller shaft 60 selectively drives the front wheels 24 when the driver selects 4×4 operation of the vehicle 20.

Figure 15:
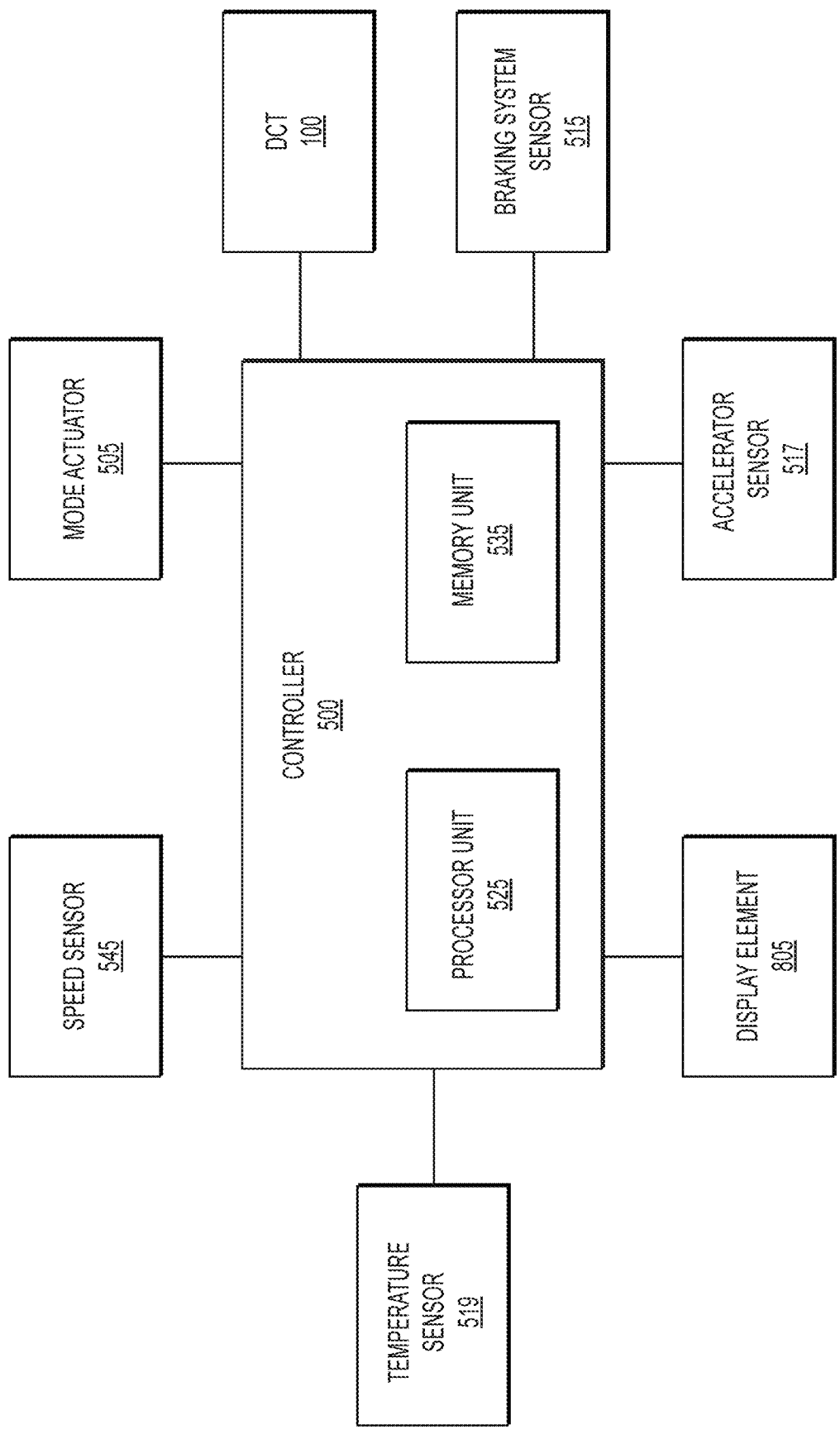
FIG. 15 is a block diagram of a controller configured to control the dual-clutch transmission.

Different methods for controlling the powertrain of the vehicle 20 will now be described with reference to FIGS. 16 to 22. According to various embodiments, a controller 500 (illustrated schematically in FIG. 3) is in communication with the DCT 100 to control its operation. For example, the shifting of the gears of the DCT 100, including the gears 600, is controlled by the controller 500, notably by controlling the actuation of the first and second clutches 204a, 204b and controlling the shift actuators. As shown in FIG. 15, the controller 500 has a processor unit 525 for carrying out executable code, and a non-transitory memory unit 535 that stores the executable code in a non-transitory medium (not shown) included in the memory unit 535. The processor unit 525 includes one or more processors for performing processing operations that implement functionality of the controller 500. The processor unit 525 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory unit 535 may be a semiconductor memory (e.g., read-only memory (ROM) and/or random-access memory (RAM)), a magnetic storage medium, an optical storage medium, and/or any other suitable type of memory. While the controller 500 is represented as being one control unit in this implementation, it is understood that the controller 500 could comprise separate control units for controlling components separately and that at least some of these control units could communicate with each other. Moreover, in some embodiments, the controller 500 could be in communication with an electronic control unit (ECU) of the vehicle 20 that controls operation of the engine 52. In some embodiments, the controller 500 could be the ECU of the vehicle 20.

During operation, the driver of the vehicle 20 may face situations in which it is beneficial to shift the DCT 100 from operating in the high gear setting to the low gear setting or vice-versa. As described above, the high gear setting is associated with operating the DCT 100 such as to drive the output shaft 740 in part by the high transmission gear 730 driving the high transmission gear 730', while the low gear setting is associated with operating the DCT 100 such as to drive the output shaft 740 with the low transmission gear 732 driving the low transmission gear 732'. For example, when the vehicle 20 is traversing a rocky terrain (i.e., while rock crawling), it may be beneficial for the user to shift the DCT 100 such as to operate in the low gear setting to maximize a torque output at the output shaft 740. In a conventional vehicle equipped with a subtransmission that allows for shifting into high and low gear settings, this requires the driver to first stop the vehicle to be in a stand-still state (i.e., at rest) and then shifting from operating in the high gear setting to the low gear setting. This may be bothersome to the driver as it could require stopping the vehicle many times to shift the DCT back and forth from the high gear setting to the low gear setting as needed. Thus with particular reference to FIGS. 16 and 17, a method 800 for controlling the powertrain of the vehicle 20 in order to shift between the high gear setting and the low gear setting without stopping the vehicle 20 will be described herein.

At step 810, the method 800 begins with the vehicle 20 driving with the DCT 100 operating in the high gear setting or the low gear setting. That is, either the high transmission gear 730 or the low transmission gear 732 is drivingly engaged to the input shaft 702 to drive the output shaft 740. The driver then operates the gear shifter 56 to shift the DCT 100 to be in the other one of the high gear setting or the low gear setting. That is, if at step 810 the DCT 100 is in the high gear setting, the driver operates the gear shifter 56 to shift the DCT 100 to be in the low gear setting. In that case, the method 800 proceeds to step 820a where a low gear shift request is generated and transmitted to the controller 500 requesting the low transmission gear 732 to be engaged on the input shaft 702 in order to drive the output shaft 740 with the low transmission gear 732. On the other hand, if at step 810 the DCT 100 is in the low gear setting, the driver operates the gear shifter 56 to shift the DCT 100 be in the high gear setting. In that case, the method 800 proceeds to step 820b where a high gear shift request is generated and transmitted to the controller 500 requesting the high transmission gear 730 to be engaged on the input shaft 702 in order to drive the output shaft 740 with the high transmission gear 730.

In this embodiment, from step 820a, the method 800 proceeds to step 830 whereby the controller 500 validates if an operating speed associated with the vehicle 20 is adequate for shifting to the low gear setting. In the present embodiment, the operating speed is determined based at least in part on the rotational speed of the transmission output shaft. More specifically, a sensor (not shown) detects the speed of the front propeller shaft gear 752'. It is contemplated that the operating speed could be determined based on the vehicle speed, but in such cases the exact, correct tire size would need to be received by the controller 500 (for example by entering the tire size in the vehicle setup by the user). In particular, at step 830, the controller 500 compares the operating speed associated with the vehicle 20 to a predetermined speed $V_{H1}$. In this embodiment, the operating speed associated with the vehicle 20 compared at step 830 is a speed of the vehicle 20, and the predetermined speed $V_{H1}$ is a predetermined vehicle speed $V_{H1}$. In response to the speed of the vehicle 20 being greater than the predetermined vehicle speed $V_{H1}$, the controller 500 denies the low gear shift request generated at step 820a. Notably, this helps protect the DCT 100 and/or the engine 52 as shifting into the low gear setting while the vehicle 20 is travelling at high speeds could potentially cause damage to the DCT 100 or the engine 52. As shown in FIG. 15, in this embodiment, a speed sensor 545 senses the speed of the vehicle 20 and is in communication with the controller 500 to transmit electronic signals thereto that are indicative of the speed of the vehicle 20.

In this embodiment, after denying the low gear shift request, the method 800 proceeds to step 840 whereby the controller 500 causes a display element 805 (FIG. 15) visible to the driver to display an indication to the driver indicative of the denial of the low gear shift request. In this embodiment, as shown in FIG. 2, the display element 805 is provided on a dashboard of the vehicle 20. For instance, the display element 805 may be an icon on a display screen disposed on the dashboard of the vehicle 20. From the step 840, the method 800 then proceeds back to step 810 as the vehicle 20 continues to be driven with the DCT 100 operating in the high gear setting.

If instead, at step 830, the controller 500 determines that the speed of the vehicle 20 is less than or equal to the predetermined vehicle speed $V_{H1}$, the method 800 proceeds to step 850 in order to fulfill the shift request.

It is contemplated that, in other embodiments, at step 830, the operating speed associated with the vehicle 20 could be a speed of the DCT 100 (e.g., of the central clutch gear 200 or another part of the DCT 100) and the predetermined speed $V_{H1}$ to which it is compared is a corresponding predetermined speed of the DCT 100.

Figure 16:
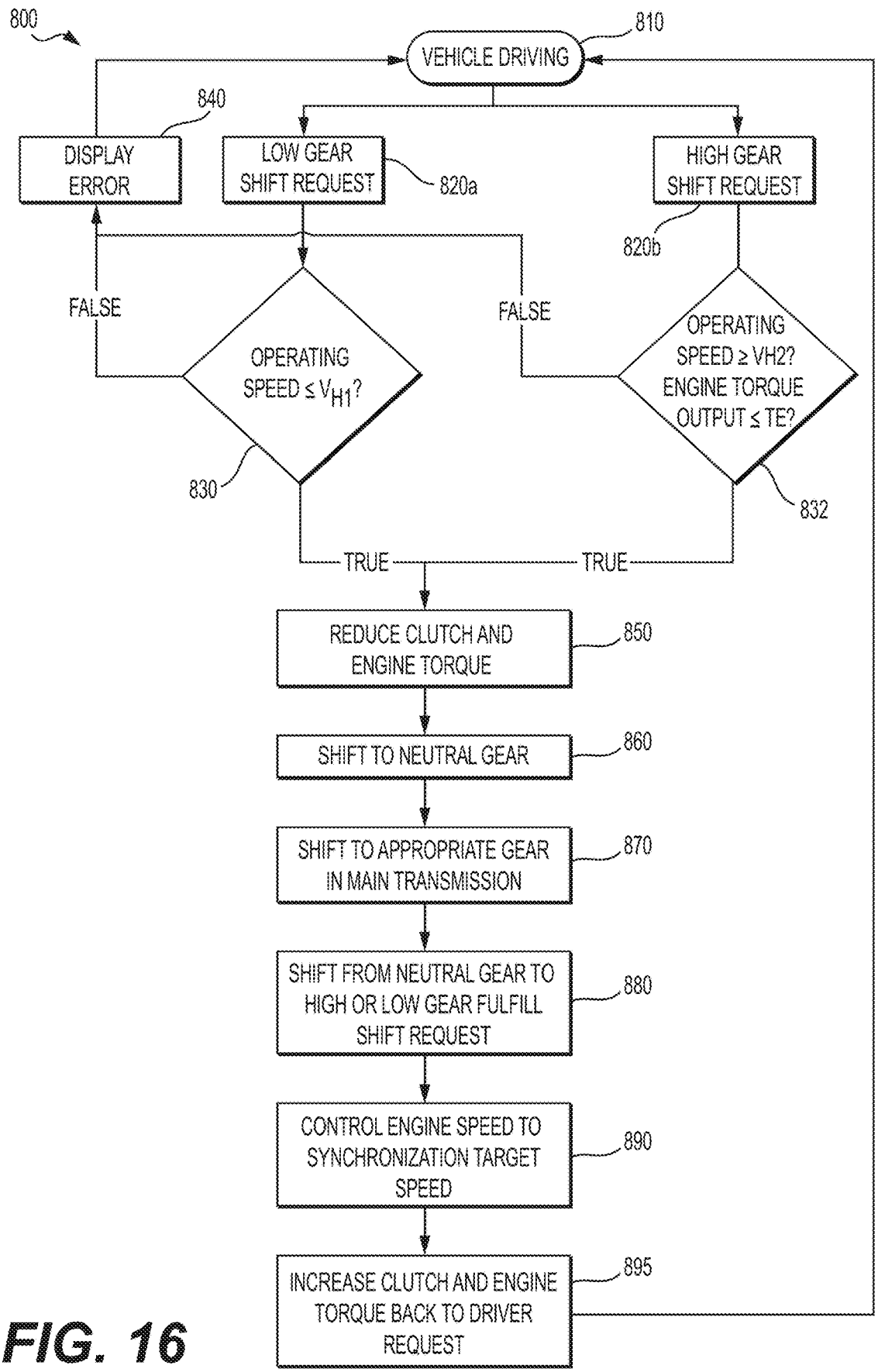
FIG. 16 is a flowchart represent a method for controlling a powertrain of the off-road vehicle of FIG. 1 in order to shift between high and low gear settings without stopping the off-road vehicle.

As shown in FIG. 16, in this embodiment, from step 820b, the method 800 proceeds to step 832 whereby the controller 500 validates if an operating speed associated with the vehicle 20 and a torque output of the engine 52 are adequate for shifting to the high gear setting. In particular, at step 832, the controller 500 compares the operating speed associated with the vehicle 20 and the torque output of the engine 52 to a predetermined map of values of the speed $V_{H2}$ and a corresponding predetermined engine torque $T_E$, the predetermined engine torque $T_E$ generally increasing as the speed $V_{H2}$ increases In this embodiment, the operating speed associated with the vehicle 20 is the speed of the vehicle 20, and the speed $V_{H2}$ is a vehicle speed $V_{H2}$. The predetermined speed $V_{H2}$ could be different from the predetermined speed $V_{H1}$ of step 830. In response to the torque output of the engine 52 being greater than the predetermined engine torque $T_E$ corresponding to the speed $V_{H2}$ the controller 500 denies the high gear shift request generated at step 820b. Notably, this helps protect the DCT 100 and/or the engine 52 as shifting into the high gear setting while the vehicle 20 is travelling at low speeds and at high engine torque could potentially cause stalling of the engine 52 or even damage to the DCT 100 or the engine 52. For example, this could be the case when the vehicle 20 is climbing up a slope. It is contemplated that, in other embodiments, at step 832, the operating speed associated with the vehicle 20 could be a speed of the DCT 100 (e.g., of the central clutch gear 200 or another part of the DCT 100) and the speed $V_{H2}$ value map to which it is compared is a corresponding value map of the speed of the DCT 100.

In this embodiment, after denying the high gear shift request, the method 800 proceeds to step 840 whereby the controller 500 causes the display element 805 (FIG. 15) to display an indication to the driver indicative of the denial of the high gear shift request. From the step 840, the method 800 then proceeds back to step 810 as the vehicle 20 continues to be driven with the DCT 100 operating in the low gear setting.

If instead, at step 832, the controller 500 determines that either the speed of the vehicle 20 is greater than or equal to the predetermined vehicle speed $V_{H2}$, or that the torque output of the engine 52 is less than or equal to the predetermined engine torque $T_E$, the method 800 proceeds to step 850 in order to fulfill the shift request.

At step 850, in response to either the low gear shift request or the high gear shift request, the torque output of the engine 52 is reduced. This corresponds to time t1 in the graph of FIG. 17 which exemplifies the variation of the torque output of the engine 52 as well as the engaged gears of the main transmission 615 and the subtransmission 700 during execution of the method 800 when the shift request is a high gear shift request. As can be seen, in this embodiment, at time t1, the engine 52 is controlled such as to reduce its torque output to a low value (e.g., as close to zero as possible while the engine 52 is running). Similarly, at step 850, a torque of each of the clutches 204a, 204b is reduced. In particular, the controller 500 controls the flow of transmission fluid to the clutches 204a, 204b such that neither of the shafts 400a, 400b is drivingly engaged by the clutches 204a, 204b. For instance, the torque of the clutches 204a, 204b is reduced to a kisspoint torque value of each of the clutches 204a, 204b. At the kisspoint torque values of the clutches 204a, 204b, the position of each of the clutches 204a, 204b is such that the clutch disks 250 and the clutch plates 242 of each clutch 204a, 204b make initial frictional contact with one another but do not yet transmit torque (i.e., they do not drive the respective shafts 400a, 400b).

Figure 17:
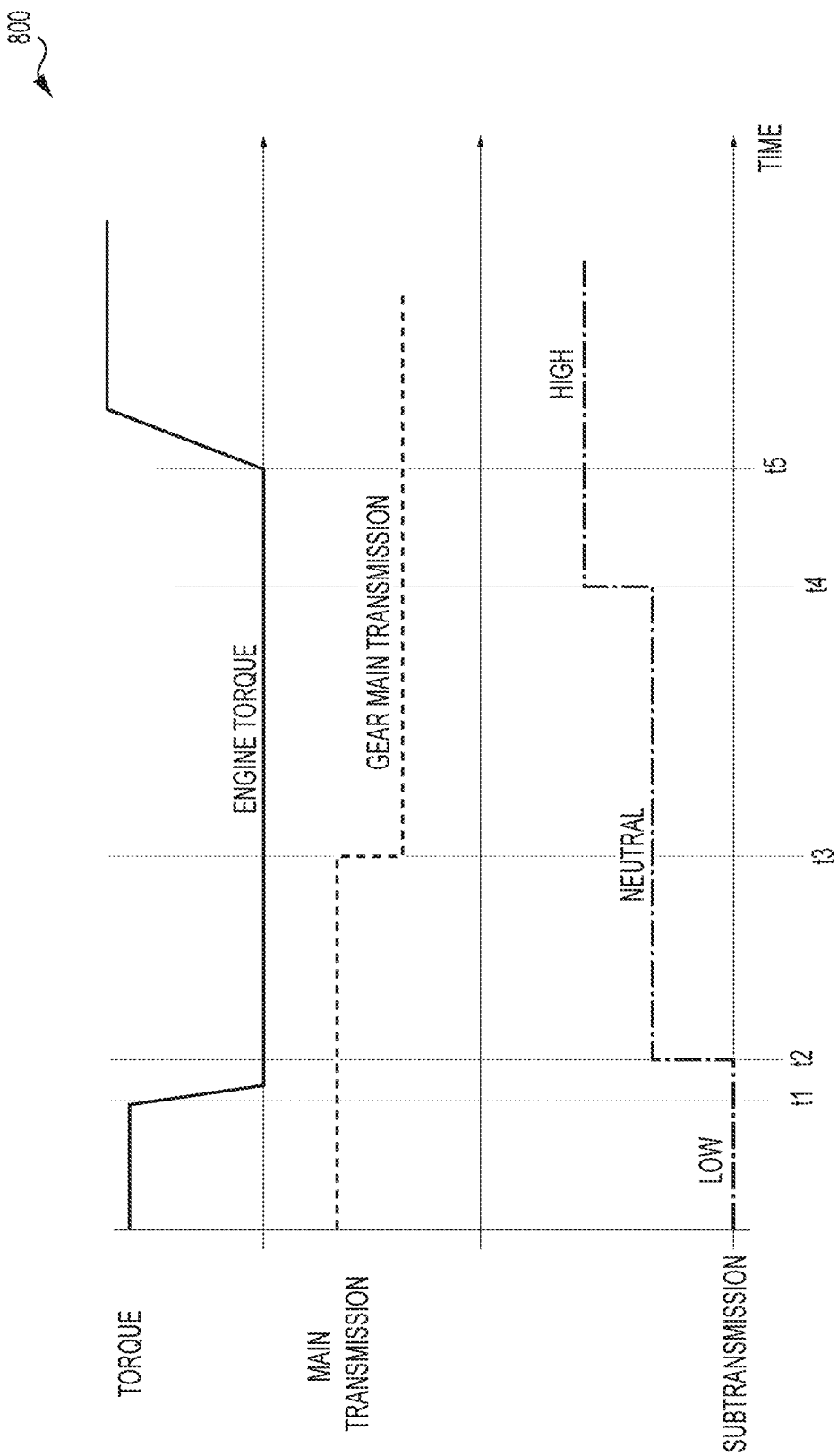
FIG. 17 is a graph representing engine torque and gear engagements in a main transmission and the subtransmission of the dual-clutch transmission during execution of the method of FIG. 16.

Next, at step 860, the controller 500 controls the DCT 100 to shift the subtransmission 700 to a neutral gear setting as shown at time t2 in FIG. 17. In the neutral gear setting, the output shaft 740 is drivingly disconnected from the input shaft 702. Notably, the high transmission gear 730 on the input shaft 702 is drivingly disengaged from the input shaft 702. Similarly, the low transmission gear 732 on the input shaft 702 is drivingly disengaged from the input shaft 702. As such, in the neutral gear setting of the subtransmission 740, the output shaft 740 is not driven by the input shaft 702 and therefore the output shaft 740 can rotate without being limited by the engaged gears of the DCT 100.

Subsequently, at step 870, with the subtransmission 700 operating in the neutral gear setting, the controller 500 selects one of the transmission gears 600 mounted to either the shaft 400a or the shaft 400b to drive the subtransmission 700 (via the layshaft 610 or 620) in order for the input shaft 702 to turn, relative to the output shaft 740, at an input shaft speed according to a gear ratio that will be implemented between the input and output shafts 702, 740 by the high transmission gear 730 if the shift request is a high gear shift request or the low transmission gear 732 if the shift request is a low gear shift request. In other words, the controller 500 selects one of the transmission gears 600 of the main transmission 615 that will cause the input shaft 702 to rotate at a speed adequate for either (i) the gear ratio implemented between the high transmission gears 730, 730' when the shift request is a high gear shift request, or (ii) the gear ratio implemented between the low transmission gears 732, 732' when the shift request is a low gear shift request. For example, if the shift request is a high gear shift request, the controller 500 selects a lower gear in the main transmission 615 than the transmission gear 600 currently engaged. Similarly, if the shift request is a low gear shift request, the controller 500 selects a higher gear in the main transmission 615 than the transmission gear 600 currently engaged. Once the appropriate one of the transmission gears 600 has been selected according to this criteria, the controller 500 shifts the main transmission 615 to engage the selected one of the transmission gears 600 to drive the subtransmission 700. Notably, as can be seen in the example of FIG. 17, the main transmission 615 is downshifted at time t3. By rotating the input shaft 702 at the appropriate speed, the vehicle 20 is safeguarded from undergoing heavy shocks caused by a large speed differential between the input shaft 702 and the output shaft 740.

With the correct gear engaged in the main transmission 615, the method 800 then proceeds to step 880 where the controller 500 shifts the subtransmission 700 to fulfill the shift request. In particular, the controller 500 shifts the subtransmission 700 from the neutral gear setting to either the high transmission gear 730 if the shift request was a high gear shift request or the low transmission gear 732 if the shift request was a low gear shift request. For instance, in the example of FIG. 17, at time t4, the subtransmission 700 is shifted to the high transmission gear 730.

At step 890, which in this embodiment is performed at the same time as step 880, a determination is made on a target engine speed at which the engine 52 should be running in order to maintain the speed of the vehicle 20 once the subtransmission 700 is shifted to the high or low gear setting (step 880). In other words, the target engine speed is determined based on the current speed of the vehicle 20 and the engaged gears in the main transmission 615 and the subtransmission 700. Notably, the target engine speed approximately corresponds to the engine speed required for the output shaft 740 to rotate at an adequate speed, given the engaged gears on the main transmission 615 and the subtransmission 700, to maintain the current speed of the vehicle 20. In particular, in this embodiment, the target engine speed is the engine speed required for the speed of the input shaft 702 to approximately match (i.e., be close to but not be the same as) the speed of the output shaft 740 considering the gear ratio implemented by the high transmission gears 730, 730' or the low transmission gears 732, 732' engaged at step 880. For instance, an approximate match of the speeds may involve a speed difference up to 50 rpm. For example, the target engine speed may approximately match the speed of the transmission gear 600 selected at step 870. The small speed differential ensuing from the approximate speed match may facilitate the engagement of a dog ring with the high or low transmission gears 730, 732. Once the target engine speed is determined, if needed the engine 52 is then controlled to adjust the engine speed (i.e., to change a current engine speed to the target engine speed). It is possible that in some cases, the engine speed requires little to no adjustment. It is contemplated that, in some embodiments, step 890 could be performed before or after step 880.

It should be noted that should the shift request be made during launch of the vehicle 20, specifically where the first clutch 204a is in a slip mode, the engine speed will not be synchronized in the present embodiment. In such cases, the clutch 204a is controlled in launch mode, with clutch pressure being gradually increased until clutch slip vanishes.

From step 890, the method 800 then proceeds to step 895 where control of the torque output of the engine 52 and the torque of the clutches 204a, 204b is returned to the driver's request at the accelerator 45. In particular, in this embodiment, as shown in FIG. 17, at time t5, the torque output of the engine 52 is increased according to a position of the accelerator 45, and the torque of the clutches 204a, 204b is controlled accordingly depending on the corresponding transmission gears that are engaged in the DCT 100. It should be understood that generally, at any one time, the torque of one of the clutches 204a, 204b will be at a driving torque value (i.e., a torque sufficient to drive the corresponding shaft 400a or 400b) while the other one of the 204a, 204b will be at a non-driving torque value (i.e., a torque insufficient to drive the corresponding shaft 400a or 400b) such as the kisspoint torque value thereof.

The method 800 then returns back to the initial step 810 with the vehicle 20 driving while the subtransmission 700 is operated in the newly engaged high or low gear setting.

As will be understood from the above, during execution of the method 800, the vehicle 20 is not required to stop moving while allowing the driver to shift between the high and low gear settings. This can provide a smoother driving experience for the driver as constantly stopping the vehicle 20 to shift between the high and low gear settings can be avoided. The method 800 can thus be performed in various driving situations, including for example when the vehicle 20 is creeping and during a rock crawling session.

It is possible that during operation of the vehicle 20, the main transmission 615 is shifted to a higher gear (i.e., upshifted) or a lower gear (i.e., downshifted), for example to satisfy a driver's acceleration request at the accelerator 45, and while the shifting is being performed, a driving situation changes that requires a reversal of the gear shift. This is particularly more probable because the vehicle 20 is an off-road vehicle which is often operated in off-road environments where driving situations tend to change more rapidly than in a road driving environment. In a conventional vehicle equipped with a DCT, if the reversal of an upshift or downshift of the DCT is required, the initial gear shift must first be completed before the reversal of the gear shift can begin. This results in wasted time engaging a gear that is no longer desired. Accordingly, with particular reference to FIGS. 18 to 20, a method 900 for controlling the powertrain of the vehicle 20 in order to more efficiently reverse a gear shift will be described herein.

Figure 18:
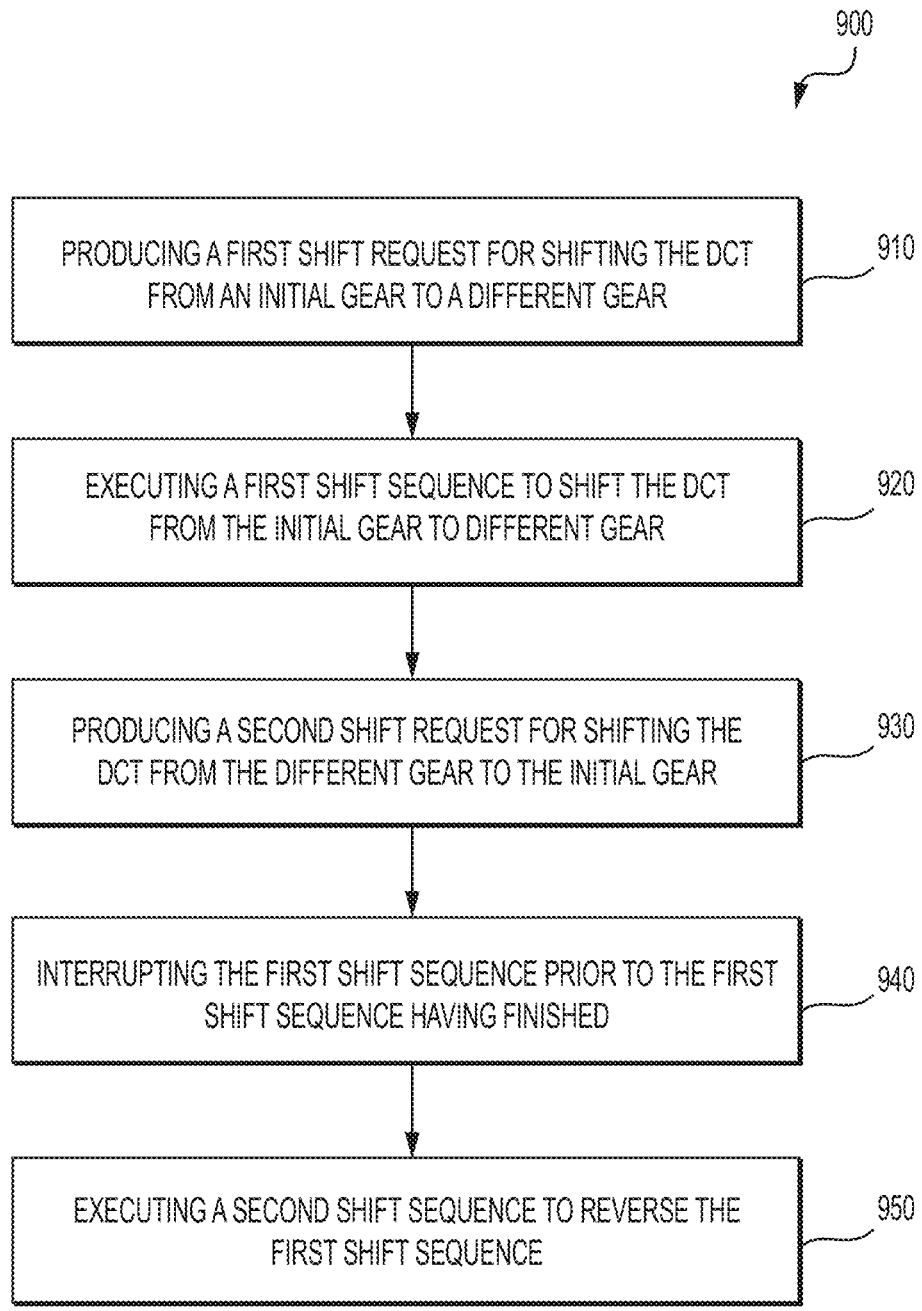
FIG. 18 is a flowchart representing a method for controlling the powertrain of the off-road vehicle of FIG. 1 in order to reverse a gear shift.

As shown in FIG. 18, the method 900 begins at step 910 where, when the vehicle 20 is operating with an "initial gear" engaged on one of the shafts 400a, 400b to drive the output shaft 740, the controller 500 produces a first shift request for shifting the DCT 100 from the initial gear to a "different gear" engaged on another one of the shafts 400a, 400b. In other words, the first shift request requires the shifting from one of the transmission gears 600 engaged on the shaft 400a or 400b to a higher or lower transmission gear 600 on the other shaft 400a or 400b. For clarity and conciseness, the remainder of the method 900 will be described with reference to the initial gear being the first gear 601 on the shaft 400a (and thereby driven by the first clutch 204a), while the different gear requested by the first shift request is the second gear 602 on the shaft 400b. It is to be expressly understood that the method 900 is not limited to a shift between the first and second gears 601, 602 nor to reversing an upshift, as the method 900 can also be applied to reversing a downshift.

In this example, the first shift request is produced by the controller 500 based on the speed of the vehicle 20 and/or a torque output required from the engine 52. Notably, based on the speed of the vehicle 20 and/or the torque output required from the engine 52, the controller 500 determines that the DCT 100 should be upshifted to operate on the second gear 602 and thus produces the first shift request. In other scenarios, the first shift request could be produced based on a signal received from a user-operated shifter (e.g., a paddle shifter) indicating that the driver wishes to perform the shift.

Figure 19:
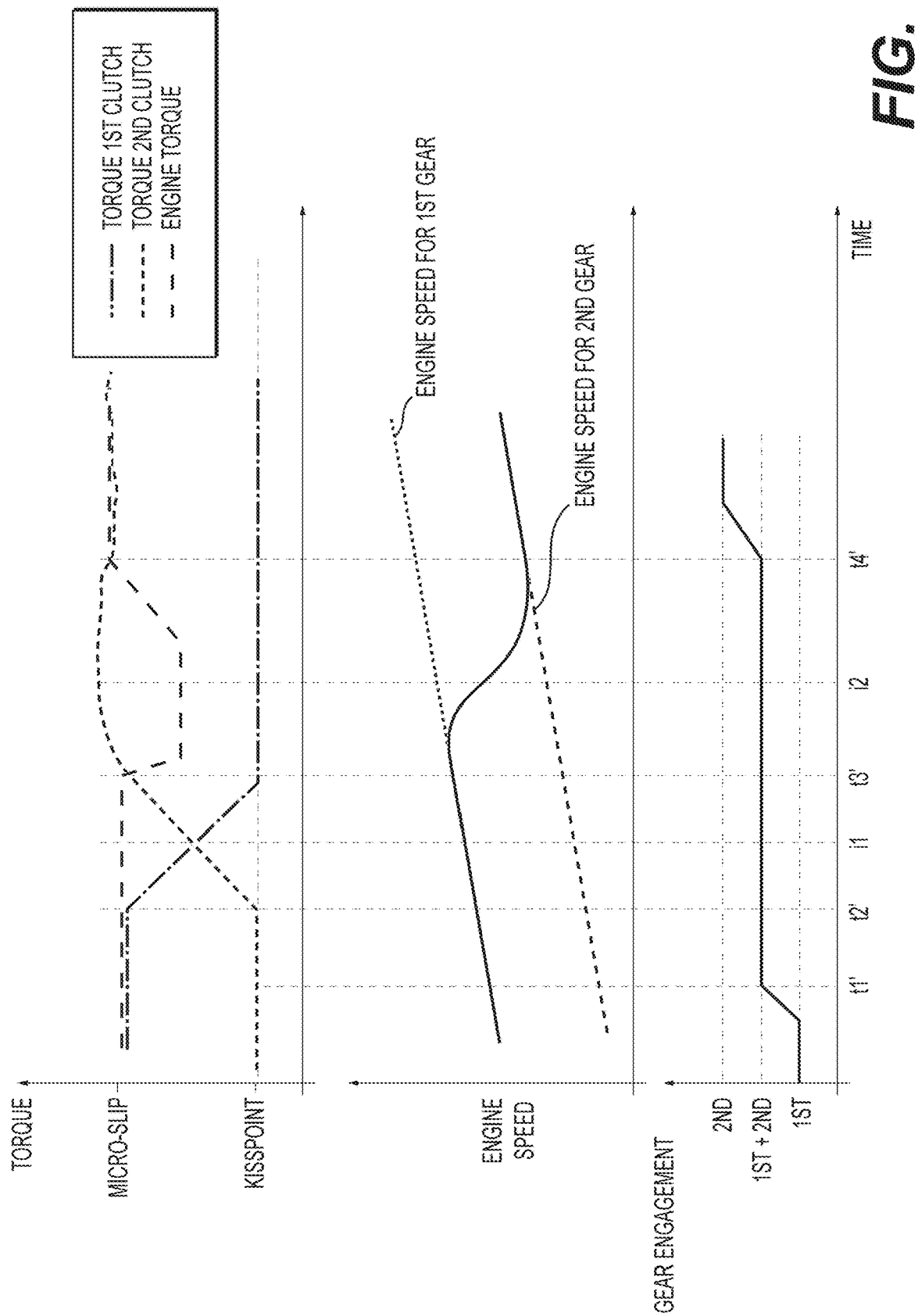
FIG. 19 shows three graphs concurrently representing gear engagement in the main transmission of the dual-clutch transmission, engine speed, and engine and clutch torques during a shift sequence for upshifting the main transmission.

In response to the first shift request, at step 920, the controller 500 executes a first shift sequence to shift the DCT 100 from the first gear 601 to the second gear 602. An exemplary first shift sequence is illustrated in the graph of FIG. 19 which shows a torque of the engine 52 and clutches 204a, 204b, a speed of the engine 52, and the engagement of the gears on shafts 400a, 400b while the first shift sequence is being executed. The first shift sequence illustrated in FIG. 19 corresponds to a "power shift" in which the DCT 100 is upshifted while the vehicle 20 is accelerating. As shown in FIG. 19, the first shift sequence begins with a torque of the first clutch 204a (which drives the shaft 400a) being at a driving torque value, while a torque of the second clutch 204b (which is responsible for driving the shaft 400b) is at a non-driving torque value. The driving torque values of the clutches 204a, 204b are torque values at which the clutches 204a, 204b drive the corresponding shafts 400a, 400b. The non-driving torque values of the clutches 204a, 204b are torque values at which the clutches 204a, 204b do not drive the corresponding shafts 400a, 400b (e.g., the kisspoint torque values thereof).

With reference to FIG. 19, according to the first shift sequence, at time t1', the second gear 602 is engaged on the shaft 200b. It should be noted, that at this point, since the torque of the second clutch 204b is at the kisspoint torque value, the engagement of the second gear 602 on the shaft 200b does not cause the second gear 602 to drive the output shaft 740. Rather, as the torque of the first clutch 204a is at the driving torque value, it is still the first gear 601 that is driving the output shaft 740. At time t2', the controller 500 begins decreasing the torque of the first clutch 204a to disengage the first clutch 204a from the engine 52. In this example, the torque of the first clutch 204a is decreased to the kisspoint torque value thereof or lower. At the same time, the controller 500 begins increasing the torque of the second clutch 204b to engage the second clutch 204b with the engine 52. In this example, the torque of the second clutch 204b is increased to a micro-slip torque value thereof or higher. At their micro-slip torque values, the clutches 204a, 204b transmit the torque provided by the engine 52. As can be seen, at time t3', a "torque handover" between the first and second clutches 204a, 204b is completed (i.e., the torque of the first clutch 204a is at the non-driving torque value and the torque of the second clutch 204b is at the driving torque value) such that the output shaft 740 is being driven by the second gear 602 engaged on the shaft 400b. Therefore, at time t3', the speed of the engine 52 is adjusted in view of the change in the operating gear to maintain the speed of the vehicle 20. More specifically, in this example, the speed of the engine 52 is decreased (since the main transmission 615 has been upshifted) since maintaining the same speed of the engine 52 would otherwise cause a sudden increase in the speed of the vehicle 20. Correspondingly, the torque output of the engine 52 decreases. To compensate for this resulting decrease in torque output of the engine 52, at time t3', the second clutch 204b begins being "overpressed" whereby the second clutch 204b is operating at a torque value greater than the micro-slip torque value thereof. Once the torque output of the engine 52 recovers to the same torque output at which it was operating prior to time t3', at time t4', the first gear 601 is disengaged from the shaft 400a while the second gear 602 remains engaged on the shaft 400b. The torque of the second clutch 204b is also returned to micro-slip torque value thereof.

The full first shift sequence as described above and illustrated in FIG. 19 is the regular shifting sequence when upshifting for example from the first gear 601 to the second gear 602. However, returning to FIG. 18, according to the method 900, at step 930, during execution of the first shift sequence, the controller 500 produces a second shift request for shifting the DCT 100 from the second gear 602 to the first gear 601 (i.e., from the "different gear" to the "initial gear"). In other words, the second shift request seeks the reversal of the first shift request.

The second shift request may be produced for different reasons. For example, in this embodiment, during execution of the first shift sequence, the controller 500 may detect an operational change related to operation of the vehicle 20, and subsequently determine that the operational change requires engagement of the first gear 601. The controller 500 thus produces the second shift request in view of that determination. For instance, the operational change may be a sudden braking of the vehicle 20, a release of the accelerator 45 by the driver, or a jump event experienced by the vehicle 20 (e.g., sensed by an accelerometer), or any other suitable event. In some cases, the second shift request may be produced as a result of receiving a signal, by the controller 500, from a user-operated shifter (e.g., a paddle shifter) indicating that the driver wishes to perform the shift.

The method 900 thus proceeds to step 940 where, in response to the second shift request, the controller 500 interrupts the first shift sequence prior to the first shift sequence having finished. In other words, the first shift sequence is interrupted before the first gear 601 is disengaged on the shaft 400b (time t4' in FIG. 19). The timing of the interruption of the first shift sequence is dependent on a time at which the second shift request is produced. With reference to FIG. 19, two alternative interruption times i1, i2 for interrupting the first shift sequence will be described herein. A first interruption time i1 takes place at any point between times t2' and t3'. Notably, the first interruption time i1 takes place during the torque handover between the first and second clutches 204a, 204b. Alternatively, a second interruption time i2 takes place at any point between times t3' and t4'. In particular, the second interruption time i2 takes place while decreasing the speed of the engine 52.

The remainder of the method 900 will now be described with regard to interrupting the first shift sequence at the first interruption time i1. A description of the remainder of the method 900 will then be provided with regard to interrupting the first shift sequence at the second interruption time i2.

When the first shift sequence is interrupted at the first interruption time i1 (i.e., before adjusting the speed of the engine 52), the interruption of the first shift sequence consists of the controller 500 stopping the decreasing of the torque of the first clutch 204a before the torque of the first clutch 204a reaches the kisspoint torque value thereof. At the same time, the controller 500 stops the increasing of the torque of the second clutch 204b before the torque of the second clutch 204b reaches the micro-slip torque value thereof. In other words, the controller 500 stops the torque handover between the clutches 204a, 204b. With the execution of the first shift sequence being interrupted before its completion, the method 900 then proceeds to step 950 (FIG. 18) whereby, in response to the second shift request, the controller 500 executes a second shift sequence to reverse the first shift sequence such that the DCT 100 engages the first gear 601 for driving on the shaft 400a.

The steps of the second shift sequence will be described herein with reference to FIG. 20 which illustrates a complete shift sequence for downshifting the main transmission 615, namely to shift the DCT 100 from the second gear 602 to the first gear 601 while the vehicle 20 accelerates. That is, the second shift sequence illustrated in FIG. 20 corresponds to a "power shift" in which the DCT 100 is downshifted while the vehicle 20 is accelerating. However, the second shift sequence executed in this context comprises selected steps of the shift sequence shown in FIG. 20 as will be understood from the below description.

Figure 20:
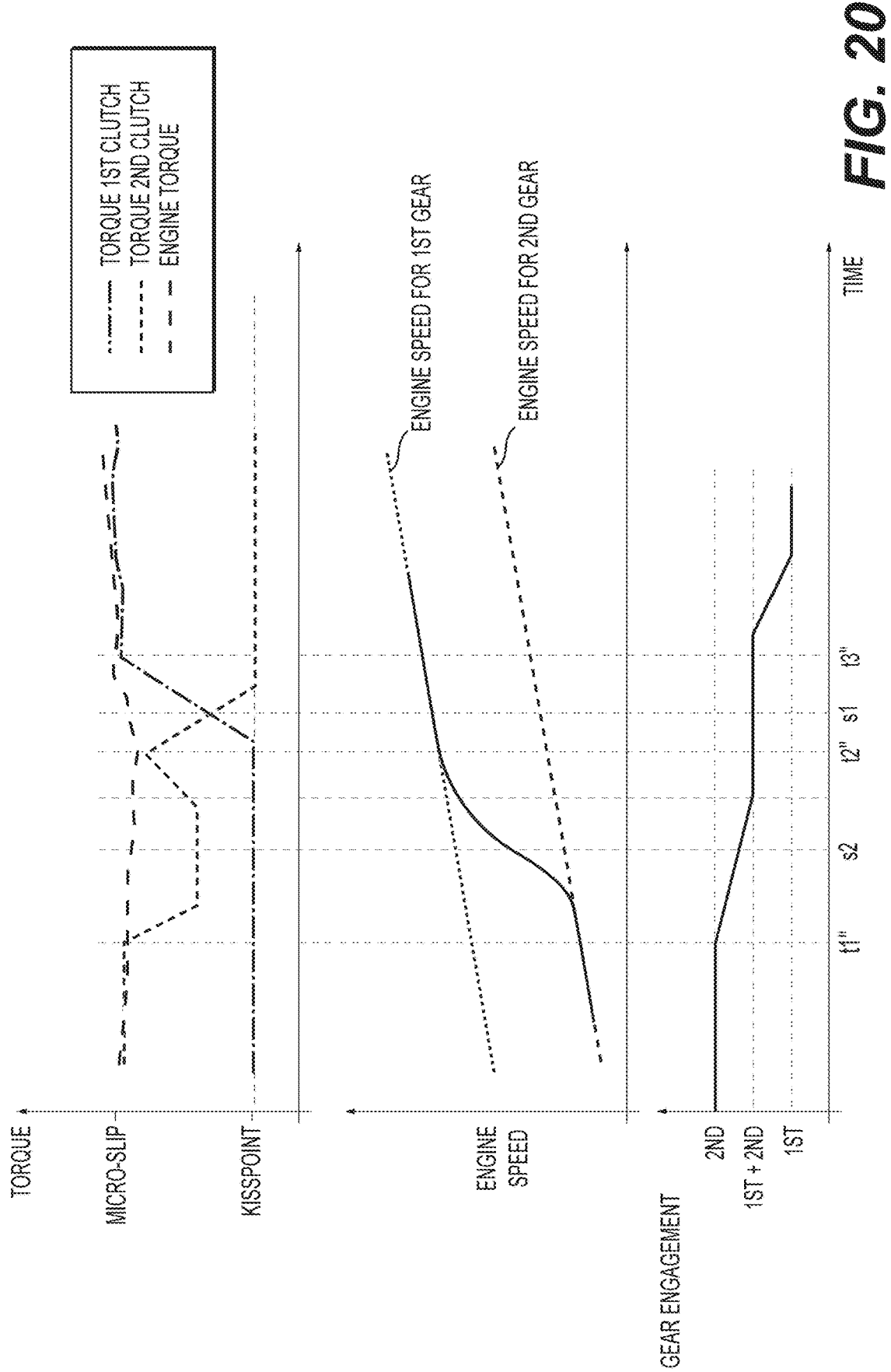
FIG. 20 shows three graphs concurrently representing gear engagement in the main transmission of the dual-clutch transmission, engine speed, and engine and clutch torques during a shift sequence for downshifting the main transmission.

With reference to FIG. 20, when the first shift sequence is interrupted at the first interruption time i1, the second shift sequence begins at a first start time s1. Notably, at the first start time s1, the controller 500 begins decreasing the torque of the second clutch 204b to at least its kisspoint torque value and increasing the torque of the first clutch 204a to at least its micro-slip torque value. As such, the torque handover between the first and second clutches 204a, 204b that was initiated during the first shift sequence (FIG. 19) is reversed. According to the second shift sequence, the controller 500 also maintains the first gear 601 engaged on the shaft 400a, as opposed to disengaging the first gear 601 as is done at time t4' in the first shift sequence. Once the driving torque is returned to the first clutch 204a and the torque of the second clutch 204b is decreased to a non-driving torque, the second shift sequence finishes by disengaging the second gear 602 on the shaft 400b. With the second shift sequence completed, the method 900 finishes as the first shift request was reversed without first completing the first shift sequence.

Returning now to FIG. 19, if at step 940, the first shift sequence is interrupted at the second interruption time i2 instead of the first interruption time i1, the controller 500 interrupts the first shift sequence during the adjusting of the speed of the engine 52 by stopping the adjusting of the speed of the engine 52. More specifically, in this example, the controller 500 stops the decreasing of the speed of the engine 52. While in this example the second interruption time i2 is during the decrease of the speed of the engine 52, it is contemplated that, in other examples, depending on when the second shift request takes place, the second interruption time i2 could be once the speed of the engine 52 has already been fully decreased. With the execution of the first shift sequence interrupted before its completion, the method 900 then proceeds to step 950 (FIG. 18) whereby, in response to the second shift request, the controller 500 executes the second shift sequence to reverse the first shift sequence. As the first shift sequence is interrupted at a different time than that described above in respect of the first interruption time i1, the second shift sequence is different from that described above.

With reference to FIG. 20, when the first shift sequence is interrupted at the second interruption time i2, the second shift sequence begins at a second start time s2. Notably, at the second start time s2, the second shift sequence begins by increasing the speed of the engine 52 to a speed that is appropriate for driving the first gear 601. After increasing the speed of the engine 52, the torque handover between the clutches 204a, 204b which was affected in the first shift sequence is reversed. More specifically, in the second shift sequence, after increasing the speed of the engine 52, the controller 500 lowers the torque of the second clutch 204b to at least the kisspoint torque value thereof and increases the torque of the first clutch 204a to at least the micro-slip value thereof. The remainder of the second shift sequence is then completed as described above with regard to the first start time s1.

As such, after having concluded the step 950, the shift from the first gear 601 to the second gear 602 has been reversed before the completion of the first shift sequence. As will be appreciated, this can save time for reversing a gear shift compared to conventional methods such that the correct gear will be engaged in a timelier manner. For instance, in some cases, this may add up to about 0.3 to 0.4 seconds of time saved. Furthermore, the reversal of the gear shift is not noticeable by the driver and thus does not negatively affect the smoothness of the ride of the vehicle 20.

Although in the example provided above the first shift request is for an upshift and the second shift request is for a downshift, it will be understood that the method 900 can be performed for the opposite scenario where the first shift request is for a downshift and the second shift request is for an upshift. In that scenario, the graph of FIG. 20 would correspond to the "first shift sequence", and the start times s1, s2 would be the first and second interruption times while the times i1, i2 in FIG. 19 would correspond to the start times for the second shift sequence to reverse the first shift sequence. For a better understanding of this scenario, a brief description of the full shift sequence shown in FIG. 20 will be provided herein.

With reference to FIG. 20, according to this shift sequence for downshifting the main transmission 615 from the second gear 602 to the first gear 601, at time t1", the first gear 601 is engaged on the shaft 400a. It should be noted, that at this point, since the torque of the first clutch 204a is at the kisspoint torque value, the engagement of the first gear 601 on the shaft 400a does not cause the first gear 601 to drive the output shaft 740. Rather, as the torque of the second clutch 204a is at the driving torque value, it is still the second gear 602 that is driving the output shaft 740. At the same time t1", the speed of the engine 52 is increased to prepare for driving engagement of the first gear 601, and the controller 500 momentarily reduces the torque of the second clutch 204b to allow some slip to occur at the second clutch 204b in order to compensate for the increased engine speed. At time t2", with the speed of the engine 52 increased, the torque handover between the clutches 204a, 204 begins. Notably, the controller 500 increases the torque of the first clutch 204a from the non-driving torque value thereof to a driving torque value (in this example the micro-slip torque value) to engage the first clutch 204b with the engine 52, and decreases the torque of the second clutch 204b from the driving torque value thereof (in this example the kisspoint torque value) to disengage the second clutch 204b from the engine 52. Subsequently, at time t3", with the torque handover between the clutches 204a, 204b completed, the controller 500 controls the DCT 100 to disengage the second gear 602 on the shaft 400b in order to reduce friction, while the first gear 601 remains engaged on the shaft 400a.

As mentioned above, when the first shift sequence corresponds to the shift sequence of FIG. 20, the time at which the controller 500 interrupts the first shift sequence at step 940 can be either the time s1 or the time s2. If the chosen interruption time is time s1, the interruption of the first shift sequence comprises stopping the increasing of the torque of the first clutch 204a and stopping the decreasing of the torque of the second clutch 204b. The second shift sequence executed at step 950 then begins at time i1 in the graph of FIG. 19. Notably, this includes reversing the initiated torque handover between the clutches 204a, 204b, reducing the speed of the engine 52 at time t3' once the torque handover has been reversed, and at time t4', disengaging the first gear 601 on the shaft 400a to reduce friction while maintaining the second gear 602 engaged on the shaft 400b.

Alternatively, if the chosen interruption time in the shift sequence of FIG. 20 is time s2, the interruption of the first shift sequence comprises stopping the increasing of the speed of the engine 52. The second shift sequence executed at step 950 then begins at time i2 in the graph of FIG. 19. Notably, this includes decreasing the speed of the engine 52 in order to maintain the speed of the vehicle 20 and subsequently, at time t4', disengaging the first gear 601 on the shaft 400a to reduce friction while maintaining the second gear 602 engaged on the shaft 400b.

As will be appreciated, the method 900 can be performed when shifting from any two adjacent gears, whether initially upshifting or downshifting.

A method 1000 for accelerating the vehicle 20 from rest will now be described with reference to FIGS. 21 and 22. The method 1000 as described herein seeks to provide a selectable mode in which the powertrain of the vehicle 20 can be operated to obtain a faster acceleration of the vehicle 20 from rest, thereby providing the vehicle 20 with a greater 0-100 km/h performance than in a standard operation mode. Some conventional vehicles are provided with a launch control mode for a similar purpose, however the implementation of this mode typically seeks to limit spinning of the driving wheels of the vehicle. While this may be suitable for a road vehicle, off-road vehicles such as the vehicle 20 tend to perform better when their driving wheels are slipping, and therefore conventional launch control modes are not ideal for an off-road vehicle.

Figure 21:
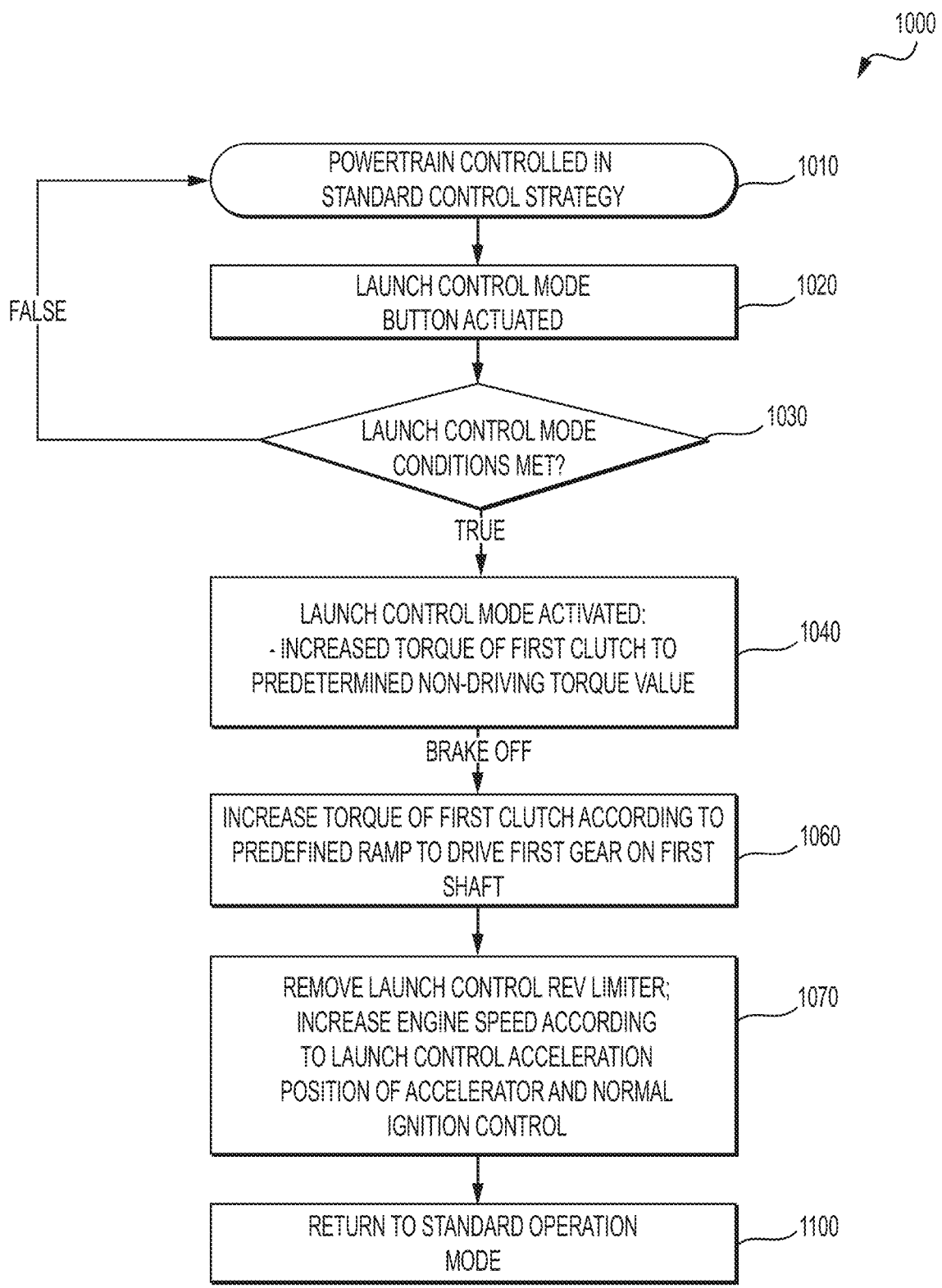
FIG. 21 is a flowchart representing a method for accelerating the off-road vehicle of FIG. 1 from rest.

With reference now to FIG. 21, the method 1000 begins at step 1010 with the powertrain being controlled according to a standard control strategy. The standard control strategy corresponds to a standard operation mode of the powertrain, where no specific out-of-routine control strategy is being implemented. At subsequent step 1020, while the vehicle 20 is at rest, the controller 500 receives a mode indication from a mode actuator 505 (FIGS. 2, 15) indicating that the driver of the vehicle 20 has selected a launch control mode for accelerating the vehicle 20 from rest. It is to be understood that, at step 1020, the vehicle 20 is defined as being at rest if the vehicle 20 is immobile (i.e., brake pedal actuated), with the engine 52 running, and a forward drive gear engaged by the gear shifter 56 (i.e., in this embodiment, specifically in the high gear setting). These may be referred to as initial mode conditions which must be satisfied to enable the mode actuator 505. In other words, if these initial mode conditions are not met, the mode actuator 505 does not generate the mode indication when actuated. As shown in FIG. 15, the mode actuator 505 is in communication with the controller 500. In this embodiment, as shown in FIG. 2, the mode actuator 505 is disposed on or near a dashboard of the vehicle 20 for operation by the driver. The mode actuator 505 may be a button or any other suitable user-operator actuator (e.g., a switch). The user can let go of the mode actuator 505 once it has been actuated.

Once the mode indication is received, the method 1000 proceeds to step 1030 where the controller 500 validates if the conditions for engaging the launch control mode are satisfied. In particular, the controller 500 validates that it receives a brake-on indication from a braking system sensor 515 (see FIG. 15) indicating that the braking system of the vehicle 20 has been activated. In this embodiment, the braking system is activated when the brake pedal (not shown) is held down by the driver to immobilize the vehicle 20. The controller 500 also verifies that the speed of the vehicle 20 is null. At step 1030, the controller 500 also determines if the accelerator 45 is positioned at its launch control acceleration position. In this embodiment, the accelerator 45 is activated for launch control acceleration when the accelerator pedal 45 is held down by the driver. Notably, in this embodiment, as shown in FIG. 15, the controller 500 is in communication with an accelerator sensor 517 which sends a signal to the controller 500 indicative of a position of the accelerator 45. In this embodiment, the launch control acceleration position of the accelerator 45 corresponds to a position at which the accelerator 45 requests an acceleration equal to or greater than a predetermined acceleration threshold. For instance, in this embodiment, the predetermined acceleration threshold is 40% of the maximum acceleration that can be requested by the accelerator 45. The predetermined acceleration threshold may be greater in other embodiments (e.g., 60%, 80% of the maximum acceleration that can be requested). In yet other embodiments, the predetermined acceleration threshold may be 100% of the maximum acceleration. In other words, the launch control acceleration position of the accelerator 45 corresponds to the position at which the accelerator 45 requests the maximum acceleration provided by the engine 52. That is, the launch control acceleration position of the accelerator 54 may be the maximum acceleration position of the accelerator 45. In this embodiment, the maximum acceleration position of the accelerator 45 corresponds to the accelerator pedal being fully pressed by the driver. The controller 500 may also validate that the DCT 100 is engaged in the high gear setting. If the controller 500 determines that one of these conditions is not met, the method 1000 restarts at step 1010. The controller 500 may trigger an alert to inform the driver of the denial of operation in the launch control mode. For instance, in this embodiment, the controller 500 causes the display element 805 (FIG. 15) or a different display element visible to the driver to display an indication to the driver indicative of the denial of operation in the launch control mode. In this example, the display element 805 is an icon on a display screen disposed on the dashboard of the vehicle 20. In other embodiments, the alert triggered controller 500 may be an audio signal instead of visual signal (e.g., an alert sound played by a speaker).

Furthermore, in some embodiments, subsequent to receiving the mode indication and prior to receiving the brake-off indication, the controller 500 verifies one or more pre-launch deactivation conditions on the basis of which the controller 500 returns to the standard operation mode of the powertrain (i.e., aborting the launch of the vehicle 20 in the launch control mode). For instance, one of the pre-launch deactivation conditions may relate to a time limit for receiving the brake-on indication. Notably, in some embodiments, the controller 500 determines if a time limit (e.g., 10 seconds) counted from the moment the mode indication was received has been reached. If the time limit has been reached, the controller 500 determines that the pre-launch deactivation condition has been met. In some embodiments, one of pre-launch deactivation conditions may relate to a temperature of the transmission fluid of the DCT 100 (i.e., the transmission fluid that is routed to the clutches 204a, 204b for actuation thereof). In particular, the controller 500 determines if the temperature of the transmission fluid is equal to or greater than a predetermined temperature threshold. If the temperature of the transmission fluid is equal to or greater than the predetermined threshold, the controller 500 determines that the pre-launch deactivation condition has been met. A temperature sensor 519 (FIG. 15) in communication with the controller 500 transmits signals to the controller 500 representative of the temperature of the transmission fluid. Once the controller 500 determines that one or more of the pre-launch deactivation conditions have been met, the controller 500 returns to the standard operation mode.

In some additional or alternative embodiments, one of pre-launch deactivation conditions could relate to a temperature of the clutch disks 250. In particular, the controller 500 determines if the temperature of the clutch disks 250 is less than a predetermined clutch-related temperature threshold. Determining or estimating the temperature of the clutch disks 250 is contemplated according to a variety of known methods and is not meant to be particularly limited. If the temperature of the clutch disks 250 is less than the predetermined threshold, the controller 500 determines that the pre-launch deactivation condition has been met. Once the controller 500 determines that one or more of the pre-launch deactivation conditions have been met, the controller 500 returns to the standard operation mode.

If the controller 500 validates that the launch control conditions are met (and, optionally that the pre-launch deactivation conditions have not been met), the method 1000 proceeds to step 1040 where, in response to receiving at least the mode indication and the brake-on indication and determining that the accelerator 45 is in the launch control acceleration position, the powertrain is controlled according to the launch control mode which is implemented by a launch control strategy that is different from the standard control strategy. The launch control strategy, which begins at time $t_A$, is illustrated in greater detail in the graph of FIG. 22. With the accelerator 45 at an activated position, under normal conditions, the speed of the engine 52 would increase relatively quickly. Under the launch control strategy, the engine 52 is controlled, by a launch control rev limiter at time $t_A$, in order to limit the speed of the engine 52 to an increased yet limited engine idle speed $S_L$ that is greater than an idle speed SI of the engine 52 in the standard control strategy and without activation of the accelerator 45. It is noted that the term "idle" is used herein to indicate operation of the engine 52 without driving or causing movement of the vehicle 20. The launch control rev limiter function limits the engine speed according to the actual position of the accelerator 45. As one non-limiting example, for a 40% pedal position, the limit is 3,000 RPM; for 100% the limit is 5,000 RPM; it is contemplated these values could vary. In the present embodiment, the engine speed is limited using ignition control, such that the throttle valve is open and air input flow is unimpeded, providing for the engine 52 to quickly increase its speed when the limiter is removed. In this embodiment, the increase of the speed of the engine 52 to the limited speed $S_L$ causes the turbocharger 57 (FIG. 3) to provide additional boost pressure to the engine 52. This may further optimize the acceleration of the vehicle 20 in the launch control mode.

Figure 22:
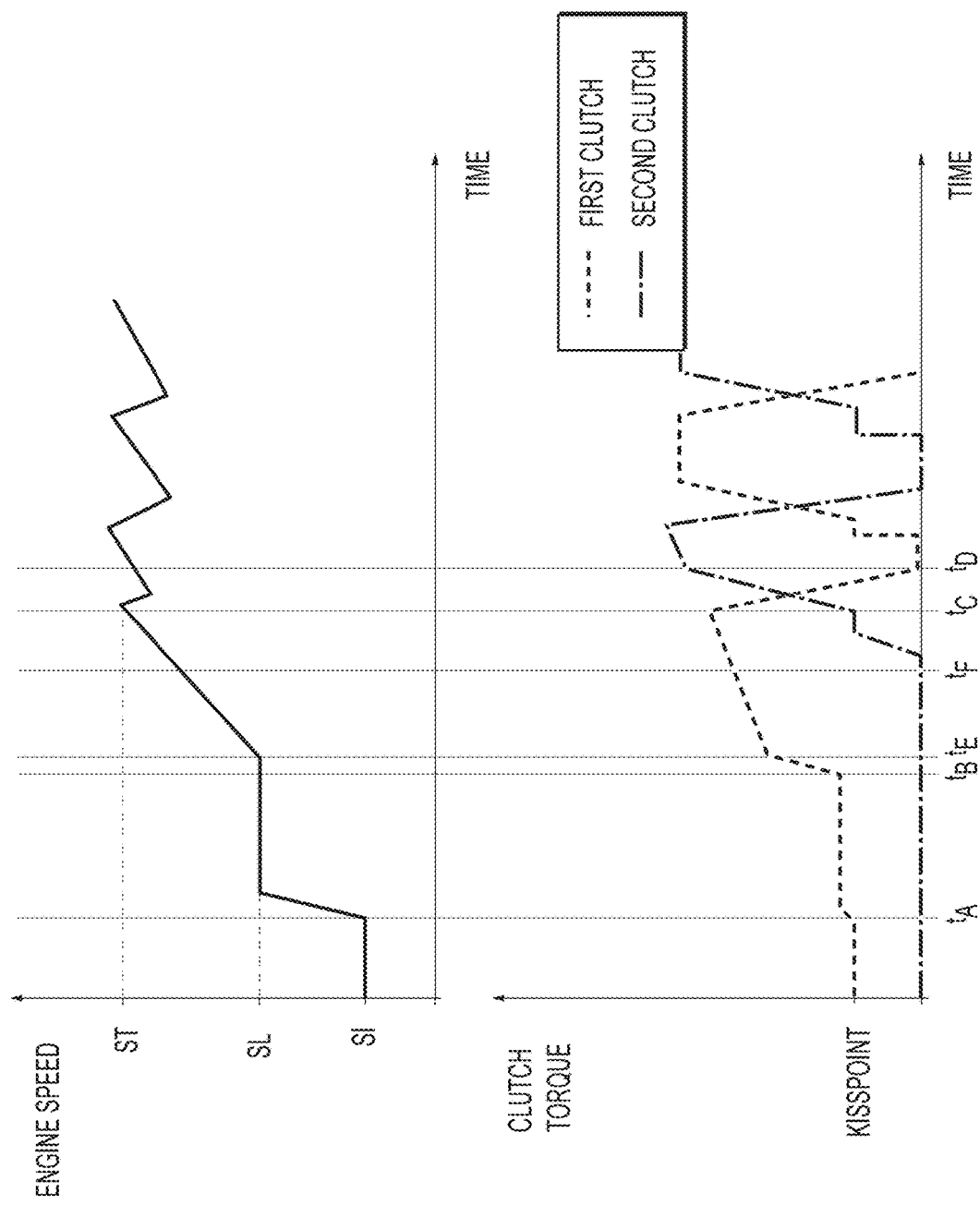
FIG. 22 shows two graphs concurrently representing engine speed and clutch torque of the dual-clutch transmission during execution of the method of FIG. 21.

Prior to activation of the launch control strategy with the vehicle 20 immobile and the engine 52 running, as shown in FIG. 22, the torque of the first clutch 204a is at about the kisspoint torque value thereof; the torque of the second clutch 204b is zero. With commencement of the launch control strategy at time $t_A$, the pressure of the first clutch 204a is increased to slightly above the kisspoint torque value thereof; the torque of the second clutch 204b remains zero.

While the powertrain is being controlled according to the launch control strategy, the controller 500 receives, at time $t_B$ in FIG. 22, a brake-off indication indicating that the braking system has been released. In this embodiment, the brake-off indication is transmitted to the controller 500 by the braking system sensor 515 when the driver lets go off the brake pedal. In response to receiving the brake-off indication, the method proceeds to step 1060, with the controller 500 increasing the torque of the first clutch 204a according to a predefined ramp to drive the first gear 601 on the shaft 400a. As will be understood, the first gear 601 corresponds to the lowest gear on the shaft 400a and therefore the acceleration of the vehicle 20 begins with the first gear 601 engaged. In this embodiment, the predefined ramp (i.e., rate) according to which the torque of the first clutch 204a is increased at time ty is steeper than a standard ramp according to which the torque of the first clutch 204a is increased in the standard control strategy. The rapid increase in the torque of the clutch 204a can cause the vehicle 20 to accelerate even more rapidly as the first gear 601 drives the output shaft 740. In other embodiments, the predefined ramp according to which the torque of the first clutch 204a is increased at time ty is the same or approximately the same as the standard ramp according to which the torque of the first clutch 204a is increased in the standard control strategy.

Once clutch slip for the first clutch 204a decreased to a predetermined threshold, e.g. 50% clutch slip, the launch control rev limiter is removed at step 1065 of the method 1000 at a time the further illustrated in FIG. 22. It is noted that standard rev limiters used to control engine speed to prevent engine damage will generally remain active when the launch control rev limiter is removed.

The engine 52 is then controlled to increase the speed thereof according to the launch control acceleration position of the accelerator 45. In other words, the throttle valve that regulates air intake into the engine 52 opens according to the position of the accelerator 45. Therefore, the throttle valve remains opens at its position corresponding to the position of the accelerator 45 and ignition timing is returned to normal in order for the engine 52 to provide a corresponding acceleration. Notably, the increased engine idle speed and increased torque of the clutch 204a performed at step 1040 can already ensure on their own a more rapid acceleration of the vehicle 20 from rest.

By this point, the vehicle 20 has undergone a significant acceleration from rest that would not otherwise be possible in the standard control strategy.

Following time $t_E$, the torque gradient of the first clutch 204a is decreased, such that the torque increases at a lesser rate. When the clutch slip of the first clutch 204a substantially reaches zero, at a time $t_F$, the launch control mode/strategy ends and the vehicle 20 returns to normal control conditions. At this point, in this embodiment, the method 1000 proceeds to step 1100 where the powertrain is returned to operating in the standard operation mode.

In at least some embodiments, as the speed of the engine 52 reaches a top speed ST that is short of the redline engine speed, at time $t_C$ in FIG. 22, optionally, the vehicle 20 can be rapidly shifted from the first gear 601 to the second gear 602. It is noted that the shift to second gear 602 occurs with the powertrain operating in the standard operation mode. This is done by effecting the torque handover between the clutches 204a, 204b. In particular, when the controller 500 determines that the vehicle 20 will be shortly shifted to the second gear 602, the pressure of the second clutch 204b is increased to the kisspoint. Then at the time $t_C$, the torque of the first clutch 204a is decreased to the predetermined non-driving torque value or lower, while the torque of the second clutch 204b is increased to drive the second gear 602. As the torque handover between the clutches 204a, 204b is taking place, the speed of the engine 52 is momentarily decreased to effect a smooth transition to the second gear 602. Thus, at time $t_D$ shortly after time $t_C$, the vehicle 20 is driving with the second gear 602 engaged.

It is contemplated that, in some embodiments, while controlling the powertrain according to the launch control strategy, the controller 500 could monitor different operational parameters to verify if it is still appropriate to remain in the launch control strategy. For instance, in some embodiments, the controller 500 could determine if one or more deactivation conditions have been met, and if they have, the controller 500 could subsequently return to the standard operation mode at step 1010 to operate the powertrain in the standard control strategy. For example, in this embodiment, one of the deactivation conditions is a time limit. Notably, in response to the controller 500 determining that the time limit of controlling the powertrain according to the launch control strategy has been reached, the launch control mode is exited and the powertrain is again operated in the standard operation mode. In some embodiments, another deactivation condition could be if the braking system is activated. For instance, while in the launch control mode, the controller 500 detects that the braking system is activated, the method 1000 could end the launch control strategy and return to step 1010. In some embodiments, another deactivation condition could be a decrease in the position of the accelerator 45. Notably, if while in the launch control mode, the controller 500 detects that the position of the accelerator 45 has decreased (e.g., the driver has let go of the accelerator 45), the controller 500 could end the launch control strategy and the method 1000 returns to step 1010. In some embodiments, another deactivation condition could be related to a time limit for receiving the brake-off indication while at step 1040. For instance, if while in the launch control mode at step 1040, a predetermined amount of time passes without having received the brake-off indication indicating that the driver has let go of the brake pedal, the controller 500 could end the launch control strategy and the method 1000 returns to step 1010. In some embodiments, another deactivation condition could be related to actuation of the mode actuator 505. For instance, if while in the launch control mode, the controller 500 receives a signal from the mode actuator 505 indicating that the driver has pressed the mode actuator 505, the controller 500 could end the launch control strategy and the method 1000 returns to step 1010. In some embodiments, another deactivation condition could be related to the shifting to the second gear 602.

While the above methods 800, 900, 1000 have been described as being executed in part or in their entirety by the controller 500, it is to be understood that the controller 500 could be in communication with other controllers to perform one or more of the methods 800, 900, 100. For instance, in order to control the engine 52, the controller 500 could be in communication with the ECU that controls the engine 52 and transmit and/or receive signals therefrom in order to perform the methods 800, 900, 1000.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for accelerating a vehicle from rest, the vehicle having a powertrain comprising:
    an internal combustion engine; and
    a dual-clutch transmission operatively connected to the engine, the dual-clutch transmission comprising:
        a first clutch and a second clutch selectively actuated to transmit motion from the engine to a first shaft and a second shaft respectively;
        at least one first gear mounted to the first shaft; and
        at least one second gear mounted to the second shaft, the method comprising:
    controlling the powertrain according to a first control strategy;
    while the vehicle is at rest, receiving a mode indication indicating that a driver of the vehicle has selected a launch control mode for accelerating the vehicle from rest;
    receiving a brake-on indication indicating that a braking system of the vehicle has been activated;
    determining that an accelerator of the vehicle is in a launch control acceleration position;
    in response to receiving at least the mode indication and the brake-on indication and determining that the acceleration is in the launch control acceleration position, controlling the powertrain according to a second control strategy to:
        increase a speed of the engine to an increased idle speed that is greater than an idle speed of the engine in the first control strategy;
        increase a torque of the first clutch and a torque of the second clutch to a respective predetermined torque value at which the clutch does not drive the corresponding one of the first shaft and the second shaft;

while controlling the powertrain according to the second control strategy:
    receiving a brake-off indication indicating that the braking system has been released;
    in response to receiving the brake-off indication:
        increasing the engine speed according to the launch control acceleration position of the accelerator;
        increasing the torque of the first clutch according to a predefined ramp to drive a lowest gear of the at least one first gear engaged on the first shaft;
        engaging a lowest gear of the at least one second gear mounted on the second shaft; and
        maintaining the torque of the second clutch at the predetermined torque value as long as the torque of the first clutch is being increased.

2. The method of claim 1, further comprising, while controlling the powertrain according to the second control strategy, as the speed of the engine nears a redline speed thereof with the lowest gear of the at least one first gear drivingly engaged, shifting the dual-clutch transmission from the lowest gear of the at least one first gear to the lowest gear of the at least one second gear by:
    decreasing the torque of the first clutch to the predetermined torque value or lower;
    increasing the torque of the second clutch to drive the lowest gear of the at least one second gear.

3. The method of claim 1, wherein:
    the vehicle further comprises a turbocharger operatively connected to the engine; and
    the increase of the speed of the engine to the increased idle speed causes the turbocharger to provide additional boost pressure to the engine.

4. The method of claim 1, further comprising:
    prior to receiving the mode indication, determining that each of a plurality of initial mode conditions have been met; and
    in response to the plurality of initial mode conditions being met, enabling a mode input, the mode indication being transmitted to the controller from the mode input upon selection of the launch mode by the operator via the mode input.

5. The method of claim 1, further comprising, while controlling the engine according to the second control strategy:
    determining that at least one deactivation condition has been met; and
    in response to the at least one deactivation condition being met, returning to a standard operation mode whereby the powertrain is operated according to the first control strategy.

6. The method of claim 5, wherein determining that the at least one deactivation condition has been met includes determining that a time limit of controlling the powertrain according to the second control strategy has been reached.

7. The method of claim 5, wherein determining that the at least one deactivation condition has been met includes determining that the accelerator position has decreased from the launch control acceleration position.

8. The method of claim 5, wherein determining that the at least one deactivation condition has been met includes determining that the dual-clutch transmission has been shifted from the lowest gear of the at least one first gear to the lowest gear of the at least one second gear.

9. The method of claim 1, further comprising, subsequent to receiving the mode indication and prior to receiving the brake-off indication:

determining that at least one pre-launch deactivation condition has been met; and in response to the at least one pre-launch deactivation condition being met, returning to a standard operation mode whereby the vehicle is operated according to the first control strategy.

10. The method of claim 9, wherein determining that the at least one pre-launch deactivation condition has been met includes determining that a time limit for receiving the brake-on indication has been reached.

11. The method of claim 9, wherein determining that the at least one deactivation condition has been met includes determining that a temperature of transmission fluid of the dual-clutch transmission is equal to or greater than a pre-determined temperature threshold.

12. The method of claim 1, wherein the predefined ramp according to which the torque of the first clutch is increased in the second control strategy is greater than a standard ramp according to which the torque of the first clutch is increase in the first control strategy.

* * * * *